United States Patent
Sakai et al.

(10) Patent No.: US 7,315,502 B2
(45) Date of Patent: Jan. 1, 2008

(54) LIGHT INTEGRATION UNIT, OPTICAL PICKUP DEVICE USING THE UNIT, AND OPTICAL DISK DEVICE

(75) Inventors: Keiji Sakai, Nara (JP); Takahiro Miyake, Soraku-gun (JP); Tetsuo Ueyama, Nara (JP); Renzaburo Miki, Soraku-gun (JP); Hiroshige Makioka, Tenri (JP); Noboru Fujita, Kitakatsuragi-gun (JP); Osamu Miyazaki, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 506 days.

(21) Appl. No.: 10/478,263

(22) PCT Filed: Nov. 5, 2002

(86) PCT No.: PCT/JP02/11538

§ 371 (c)(1),
(2), (4) Date: Nov. 17, 2003

(87) PCT Pub. No.: WO03/041066

PCT Pub. Date: May 15, 2003

(65) Prior Publication Data

US 2004/0156299 A1 Aug. 12, 2004

(30) Foreign Application Priority Data

| Nov. 9, 2001 | (JP) | ............................. 2001-345072 |
| Apr. 18, 2002 | (JP) | ............................. 2002-115922 |
| Aug. 28, 2002 | (JP) | ............................. 2002-248479 |

(51) Int. Cl.
*G11B 7/135* (2006.01)
(52) U.S. Cl. ............................. 369/112.04; 369/112.12; 369/112.15

(58) Field of Classification Search ...................... None
See application file for complete search history.

(56) References Cited

U.S. PATENT DOCUMENTS 4,731,772 A * 3/1988 Lee .......................... 369/44.14

(Continued)

FOREIGN PATENT DOCUMENTS

JP 62-147401 7/1987

(Continued)

OTHER PUBLICATIONS

International Search Report (PCT/JP02/11538) (in Japanese, no translation).

(Continued)

*Primary Examiner*—William R. Korzuch
*Assistant Examiner*—Christopher Lamb
(74) *Attorney, Agent, or Firm*—Peter J. Manus; David G. Conlin; Edwards Angell Palmer & Dodge LLP

(57) ABSTRACT

An object of the present invention is to attain stable tracking servo performance by suppressing an offset caused by a shift of an object lens or a tilt of a disk, despite the one-beam method which does not cause reduction in light quantity of the main beam. A diffraction grating is provided between a hologram and a light receiving section, and a diffraction efficiency of the diffraction grating is varied in a grating longitudinal direction. For example, if an incident light beam on the diffraction grating is shifted in the grating longitudinal direction, the quantity of received light in each light receiving section varies to cause offset. By performing tracking servo so as to cancel the change, it is possible to correct the offset, thereby attaining stable tracking servo performance.

14 Claims, 19 Drawing Sheets

U.S. PATENT DOCUMENTS

| | | | | |
|---|---|---|---|---|
| 4,924,079 | A | * | 5/1990 | Opheij et al. ............. 250/201.5 |
| 4,983,017 | A | * | 1/1991 | Tsuji et al. .................. 359/566 |
| 5,315,574 | A | * | 5/1994 | Saimi et al. ........... 369/112.03 |
| 5,353,267 | A | * | 10/1994 | Katayama ................. 369/13.32 |
| 5,475,670 | A | * | 12/1995 | Hamada et al. ........ 369/112.07 |
| 5,500,846 | A | * | 3/1996 | Ophey ......................... 369/116 |
| 5,633,844 | A | * | 5/1997 | Maeda et al. ............ 369/44.23 |
| 6,868,055 | B2 | * | 3/2005 | Ueyama et al. ........ 369/112.15 |
| 2005/0018561 | A1 | * | 1/2005 | Miyake ................... 369/44.41 |

FOREIGN PATENT DOCUMENTS

| | | |
|---|---|---|
| JP | 63-222340 | 9/1988 |
| JP | 63-222341 | 9/1988 |
| JP | 04-301228 | 10/1992 |
| JP | 4-301228/1992 | 10/1992 |
| JP | 07-050030 | 2/1995 |
| JP | 7-050030/1995 | 2/1995 |
| JP | 09-044869 | 2/1997 |
| JP | 9-161282 | 6/1997 |
| JP | 9-161282/1997 | 6/1997 |
| JP | 2001-273666/2001 | 10/2001 |

OTHER PUBLICATIONS

Sakai et al., "Hologram Laser Unit for DVDs (Recording-type)" (Paper presented at Academic Conference of Japan Society for Precision Engineering, Periodical Kansai Session, 2002, Published and Presented on Aug. 1, 2002). (Partial translation).

* cited by examiner

FIG. 8
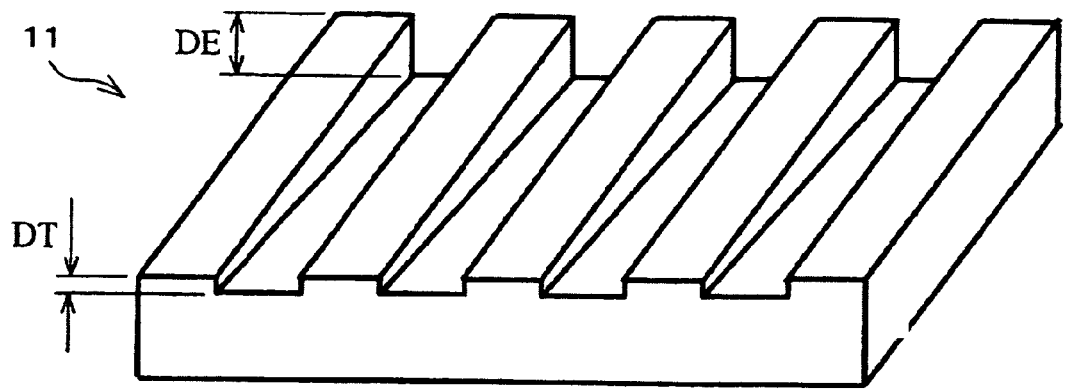
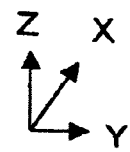
FIG. 9
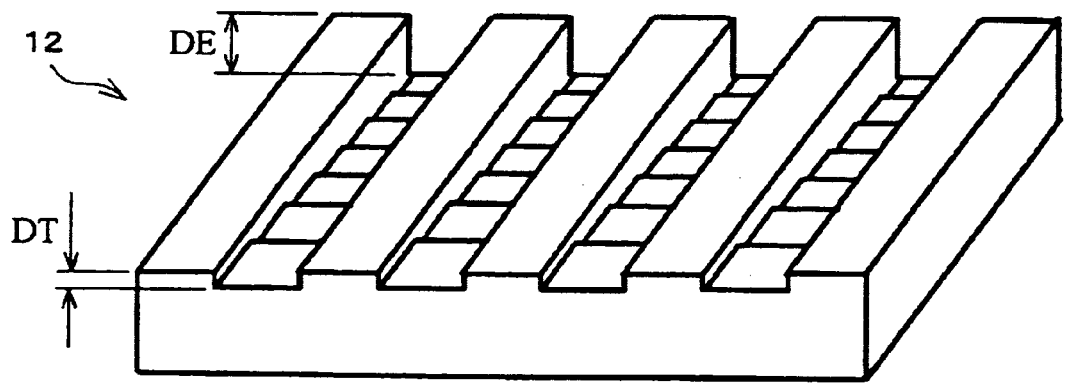
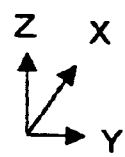

DVD-RAM DISK
($\alpha$ OF OPPOSITE POLARITY)

FIG. 19
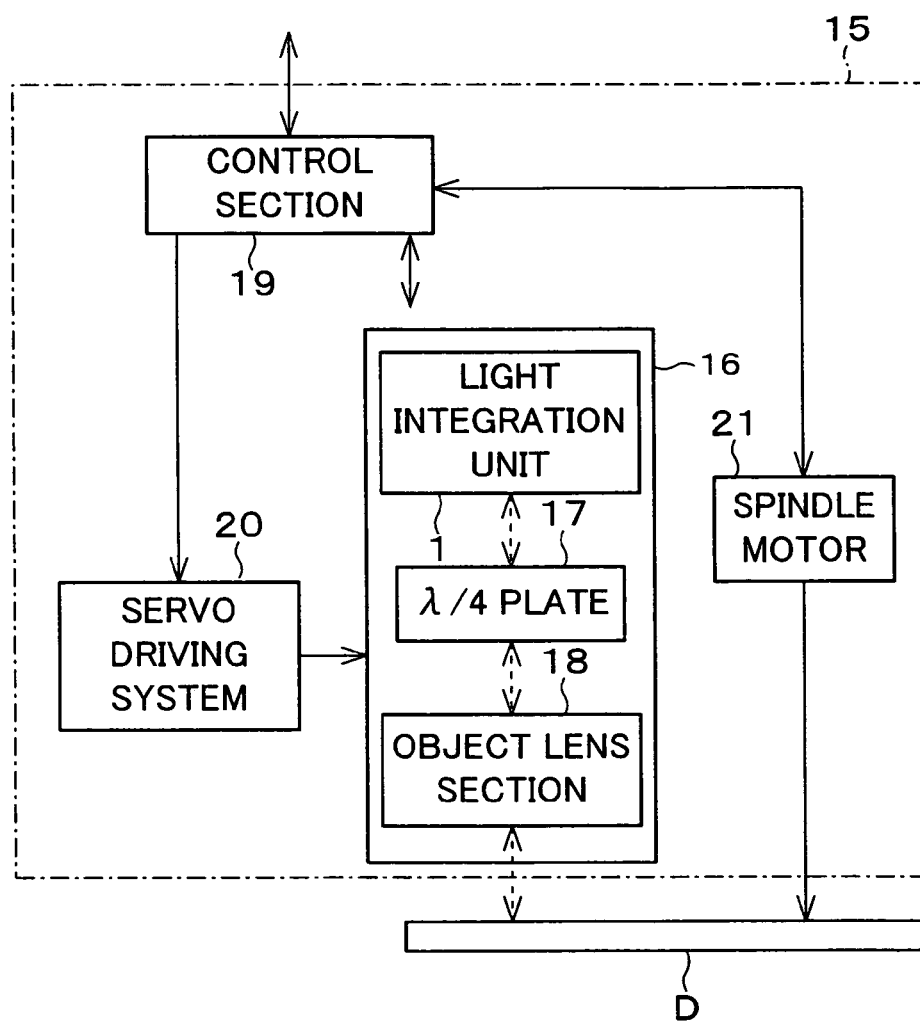
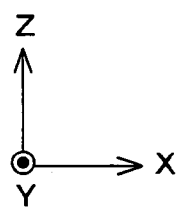

LIGHT INTEGRATION UNIT, OPTICAL PICKUP DEVICE USING THE UNIT, AND OPTICAL DISK DEVICE

This application claims priority from PCT international application No. PCT/JP02/11538 filed Nov. 5, 2002, which in turn claims priority from Japanese application No. 2001-345072 filed Nov. 9, 2001, Japanese application No. 2002-115922 filed Apr. 18, 2002, and Japanese application No. 2002-248479 filed Aug. 28, 2002, the disclosures of all of which are incorporated herein by reference.

TECHNICAL FIELD

The present invention relates to a light integration unit used in an optical disk device for optically recording or reproducing information by using an information recording medium such as an optical disk, and relates to an optical pickup device and optical disk device using such a light integration unit.

BACKGROUND ART

In order to realize a smaller, thinner, and more reliable optical pickup device, such an optical pickup device that uses a hologram has been devised. A basic configuration of such an optical pickup device for DVDs (Digital Video Disks) is described in Japanese Publication for Unexamined Patent Application, Tokukaihei 9-161282 (publication date: Jun. 20, 1997).

The hologram described in the foregoing Publication is divided into two portions in a disk radial direction, and one of the two portions is further divided into two portions in a track direction. A half of a reflected beam from the disk is used to detect a focus error signal, and the other half of the reflected beam is used to detect a track error signal. The reflected beam as a whole is used to detect an information signal. According to this configuration, a positional signal for a track, known as a push-pull signal (PP signal), can be detected from the track error signal, by further dividing a radially divided half of the beam into two in the track direction of the disk.

The optical pickup device includes a light integration unit using the hologram of the foregoing configuration, and object lens means for focusing, onto the disk, a laser beam emitted from the light integration unit.

The pickup device using the light integration unit of the foregoing configuration has the following problems.

In generating the track error signal, a two-part detector detects a difference between light intensity distributions of a right portion and a left portion of the reflected light from the disk (a radially inner portion and a radially outer portion of the light beam divided by a divisional line in a track direction).

Here, in case the object lens shifts in the radial direction, an optical axis of the reflected light beam from the disk shifts, and the center of the beam deviates from the center of the two-part detector. The object lens is displaceable within a range of approximately ±0.3 mm, so as to accommodate disk decentering. Therefore, shifting of the object lens is also caused by disk decentering.

Likewise, the center of the reflected light beam also deviates when the disk is inclined. Therefore, in either case, detracking is caused by an offset in a differential signal of the two-part detector, even though tracking is proper.

In addition to the push-pull method (PP method), a three-beam method and a differential push-pull method (DPP method) are generally used as a tracking servo method.

All of these methods detect a detrack amount by detecting a difference in light quantity of a plurality of light receiving sections. If there is no difference in light quantity, it is judged that a just track is attained.

In the three-beam method, the beams include a main beam and sub beams in front of and behind the main beam. A track error is detected from a differential signal of the sub beams. The DPP method is a combination of the PP method using a single beam, and the three-beam method, whereby a track error is detected from a differential signal of the main beam and the sub beams divided in the track direction.

This makes it possible to suppress an offset caused in the PP method. Therefore, the DPP system is a commonly used tracking servo method.

However, in these methods, the three beams are generated by a single light source. This decreases a light quantity of the main beam used for recording. As a result, there is a problem that a recording speed slows, and a high-speed recording is hindered accordingly.

An object of the present invention is to provide a light integration unit, using the one-beam method, for obtaining stable tracking servo performance by suppressing an offset caused by shifting of the objective lens and tilting of the disk, without reducing the light quantity of a main beam despite the one-beam method, and to provide an optical pickup device and an optical disk device using such a light integration unit.

DISCLOSURE OF INVENTION

To attain the foregoing object, a light integration unit of the present invention is a light integration unit, including a light emitting section for emitting a laser beam onto an information recording medium having a disk shape, a light splitting element for reflecting a reflected light beam from the information recording medium onto a hologram, a hologram for diffracting a light beam from the light splitting element to a light receiving section, and a light receiving section for receiving the light beam diffracted by the hologram, the light integration unit including: an optical element provided between the hologram and the light receiving section, a transmittance of the optical element varying in a disk radial direction.

In this configuration, in employing a one-beam tracking method in which a quantity of recording light and thereby a recording speed can be increased by irradiation of a single laser beam onto the information recording medium having the disk shape, the optical element is provided between the hologram, which is used to obtain a diffracted light beam for tracking, and the light receiving section, and the transmittance of the optical element is varied in the disk radial direction.

Therefore, if an incident light beam on the optical element is shifted in the disk radial direction due to a shift of the object lens or tilt of the disk, the incident light beam is subjected to a different transmittance of the optical element. As a result, the quantity of light received by the light receiving section changes. However, by performing tracking servo control so as to cancel such changes, it is possible to correct the offset caused by a shift of the object lens or tilt of the disk. As a result, stable tracking servo performance can be attained.

The light integration unit may be combined with lens means for focusing, onto the disk, a laser beam emitted from the light integration unit, so as to realize an optical pickup device. This makes it possible to minimize the number of optical members necessary for constituting the optical pickup device. In addition, adjustment of a signal detecting system is no longer required. As a result, it is possible to obtain an optical pickup device that is small, thin, easy to assemble, and reliable, and that has stable tracking servo performance.

In one aspect of the invention, a light integration unit of the present invention is a light integration unit employing the one-beam tracking method in which a quantity of recording light and thereby a recording speed can be increased by irradiation of a single laser beam onto the information recording medium having the disk shape, wherein the light integration unit includes an optical element provided between the hologram and the light receiving section, and the transmittance of the optical element is varied in the disk radial direction.

Furthermore, in the light integration unit of the present invention, the light splitting element is a polarizing beam splitter.

With this configuration, compared with a half mirror for example, the light beam emitted from the light emitting section can more efficiently fall on the information recording medium. Moreover, the reflected light beam from the information recording medium can be guided into the hologram more efficiently.

Moreover, in the light integration unit of the present invention, the hologram includes a diffraction grating of a groove depth d that satisfies:

$$d \times (n-1) = (k+1/2)\lambda$$

where n is a refraction index of a grating substrate, $\lambda$ is a wavelength of the light beam, and k is an integer.

With this configuration, the zeroth order component of diffracted light (transmitted light) through the hologram becomes substantially zero, thereby increasing light utilization efficiency.

Moreover, in the light integration unit of the present invention, the light receiving section has light receiving regions respectively for the +1st order component and the −1st order component of the diffracted light through the hologram.

With this configuration, it is possible to increase light utilization efficiency.

Moreover, in the light integration unit of the present invention, the optical element is so disposed that only one of the +1st order component and the −1st order component of the diffracted light through the hologram is transmitted through the optical element.

Of concern here is loss of light quantity of the light beam transmitted through the optical element, and associated reduction of a signal-to-noise ratio.

However, with the foregoing configuration, because only one of the +1st order component and the −1st order component of the diffracted light is transmitted through the optical element, there is no loss of light quantity in the 1st order component of the diffraction light that does not pass through the optical element. Therefore, the foregoing configuration is suitable for an RF signal, which requires a high signal-to-noise ratio.

Moreover, a light integration unit of the present invention is a light integration unit that emits a laser beam from a light emitting section onto an information recording medium having a disk shape, and that performs servo control of emitting a laser beam in accordance with a reflected light beam from the information recording medium, the light integration unit including: an optical element, provided in a path of the reflected light beam, whose transmittance varies in a disk radial direction.

Moreover, in the light integration unit of the present invention, the optical element is a diffraction grating that is so disposed that a grating longitudinal direction is the disk radial direction, and that has diffraction efficiency that varies in the grating longitudinal direction.

With this configuration, the optical element may be fabricated by an easier process than thin-film coating, for example.

Moreover, in the light integration unit of the present invention, a width ratio between a land and a groove of the diffraction grating continuously varies in the grating longitudinal direction.

With this configuration, only a simple process is required to vary diffraction efficiency in the grating longitudinal direction.

Moreover, in the light integration unit of the present invention, the width ratio between the land and the groove of the diffraction grating non-linearly and continuously varies in the grating longitudinal direction, so as to expand a region where a rate of change of diffraction efficiency is constant.

With this configuration, an object-lens shift detecting signal also varies at a constant rate. Therefore, it is possible to correct an offset regardless of a position of the object lens.

In one aspect of the present invention, an integration unit is provided in which the diffraction grating varies its diffraction efficiency in the grating longitudinal direction, a rate of change of the diffraction efficiency being constant regardless of a position.

Moreover, in the light integration unit of the present invention, a depth of a groove of the diffraction grating varies in the grating longitudinal direction.

The groove depth may be varied continuously or stepwise.

The diffraction efficiency can be varied in the grating longitudinal direction also by thus varying the groove depth of the diffraction grating, thereby realizing the integration unit.

Moreover, a groove depth can be obtained with high processing accuracy, even if the grating groove width is narrow. Therefore, a desired transmittance can be attained.

Moreover, in the light integration unit of the present invention, the diffraction grating is orthogonally divided into a plurality of regions with respect to a direction perpendicular to the grating longitudinal direction; and each region of the diffraction grating has a different rate of change of diffraction efficiency in the grating longitudinal direction.

With this configuration, sensitivity of the object-lens shift detecting signal can be increased without changing the configuration of the pickup. Therefore, it is possible to more accurately correct, using the object-lens shift detecting signal, an offset caused by a shift of the object lens or tilt of the disk.

In one aspect of the present invention, the light integration unit, according to the foregoing configuration, is configured so that the diffraction grating includes a plurality of regions divided by a divisional line parallel to the grating longitudinal direction, and that each region has a different rate of change of diffraction efficiency in the grating longitudinal direction. In this configuration, it is not necessary that all the regions have different diffraction efficiencies. It is sufficient that the diffraction efficiency of at least one of the regions is different. With this configuration, by suitably changing the rate of change, it is possible to increase sensitivity of the detecting signal.

Moreover, in the light integration unit of the present invention, the diffraction grating is orthogonally divided into a plurality of regions with respect to a direction perpendicular to the grating longitudinal direction; the plurality of regions of the diffraction grating include a region in which a width ratio of land and groove of the diffraction grating continuously varies in the grating longitudinal direction to continuously vary diffraction efficiency; and the plurality of regions of the diffraction grating include a region in which a width ratio of land and groove of the diffraction grating is constant to attain constant diffraction efficiency.

With this configuration, an offset caused by a shift of the object lens or tilt of the disk can be suppressed while increasing sensitivity of the object-lens shift detecting signal, because a change in light quantity of the reflected light is small owing to the fact that the reflected light from the information recording medium having the disk shape passes through the region where the width ratio of land and groove is constant, even when it does not pass through the region where the width ratio of land and groove continuously varies.

In one aspect of the present invention, the light integration unit according to the foregoing configuration is configured so that the diffraction grating includes a plurality of regions divided in a direction parallel to the grating longitudinal direction, and that each region has a different rate of change of diffraction efficiency. In this configuration, it is not necessary that all the regions have different diffraction efficiencies. It is sufficient that the diffraction efficiency of at least one of the regions is different. Moreover, in this configuration, the diffraction efficiency of at least one of the regions may have a rate of change of 0.

Moreover, in the light integration unit of the present invention, the diffraction grating is orthogonally divided into two regions with respect to a direction perpendicular to the grating longitudinal direction by such a divisional line that one of the diffraction gratings includes a region which transmits a portion of overlap of a zeroth order component and ±1st order components of light reflected and diffracted on the information recording medium having a grooved shape, and that the other of the diffraction gratings include a region which transmits a portion of non-overlap of the zeroth order diffraction component and the ±1st order components.

With this configuration, it is possible to increase sensitivity of the object-lens shift detecting signal with a minimum number of divisions in a direction perpendicular to the grating longitudinal direction. Therefore, it is possible to provide a highly-reliable light integration unit.

Moreover, in the light integration unit of the present invention, the diffraction grating is orthogonally divided into a plurality of regions with respect to a direction perpendicular to the grating longitudinal direction; and a rate of change of diffraction efficiency of the diffraction grating divided into a plurality of regions is varied in such a manner that an overall diffraction efficiency of a portion of the diffraction grating transmitting a portion of overlap of a zeroth order component and ±1st order components of light reflected and diffracted on the information recording medium having a grooved shape is substantially equal to an overall diffraction efficiency of a portion of the diffraction grating transmitting a portion of overlap of the zeroth order component and the ±1st order components.

With this configuration, it is possible to decrease a push-pull component remaining in the object-lens shift detecting signal, while further increasing sensitivity of the object-lens shift detecting signal by increasing the number of divisions in a direction perpendicular to the grating longitudinal direction.

Moreover, a light integration unit of the present invention is a light integration unit including a light receiving section for receiving light from an information recording medium, the light integration unit including: an optical element whose emission efficiency varies in a predetermined direction, the light from the information recording medium being incident on the light receiving section via the optical element.

Here, emission efficiency means transmittance or reflectivity, for example. The optical element, for example, transmits or reflects light from the information recording medium into the light receiving section.

With this configuration, the quantity of light received by the light receiving section changes when the light from the information recording medium is displaced parallel to the predetermined direction on the optical element.

In general, in an optical pickup device including a light integration unit, and in an optical disk device including the optical pickup device, an offset (shift of a zero point) of a track error signal is caused by a shift of the object lens or decentering of the disk.

In this regard, in the optical pickup device including the light integration unit of the present invention, and in the optical disk device including the optical pickup device, the optical element is so disposed that the predetermined direction is parallel to the direction in which the reflected light beam from the disk is displaced on the optical element by a shift of the object lens. Alternatively, the optical element is so disposed, for example, that the predetermined direction is parallel to the direction in which the reflected light beam from the disk is displaced on the optical element by decentering of the disk. As a result, an optical pickup device and an optical disk device are provided in which the light integration unit is provided to obtain a desired direction for the predetermined direction.

With this configuration, the quantity of the light received by the light receiving section changes in accordance with a shift of the object lens or decentering of the disk. Therefore, it is possible to detect an offset of the track error signal to detect a change in quantity of the received signal.

The offset may be used to correct the track error signal. As a result, stable track servo performance can be attained.

In addition to the foregoing configuration, the light integration unit may further include a light distributing element for distributing light from the information recording medium, wherein the light receiving section includes a first light receiving region for receiving light from the light distributing element, and a second light receiving region for receiving light from the light distributing element via the optical element.

The light distributing element may be realized by a hologram, for example. Specifically, for example, the +1st order component of the diffracted light through the hologram falls on the second light receiving region via the optical element, and the −1st order component of the diffracted light through the hologram falls on the first light receiving region.

With this configuration, the offset detected by the second light receiving region is used to correct the track error signal detected by the first light receiving region. More specifically, a correct track error signal can be obtained by calculating a difference between the track error signal and an offset weighted by a predetermined coefficient.

In this case, the predetermined coefficient used for the correction using the offset may be changed appropriately in accordance with the type of information recording medium.

For example, the optical element may be a diffraction grating. The diffraction grating may vary the width ratio of land and groove in a grating longitudinal direction, so as to vary diffraction efficiency as emission efficiency.

The optical element is not limited to the diffraction grating. For example, the optical element may be realized by including an electrode formed on a substrate, an optical medium whose transmittance (or refraction index) for an incident light beam varies in accordance with a voltage applied to the electrode, and a driving circuit for applying a voltage to the electrode. In other words, the optical element may be such that emission efficiency varies in a predetermined direction in accordance with a control signal, for example.

Further, the optical element may be a combination of plural members. For example, the optical element may be realized by including a diffraction grating, an electrode, an optical medium, and a driving circuit.

Moreover, in the light integration unit of the present invention, according to the foregoing configuration, the diffraction grating is divided into at least two parts to correspond to regions of the diffraction grating irradiated by the light beam.

The division is made in a direction perpendicular to the grating longitudinal direction.

With this configuration, it is possible to increase sensitivity of the object-lens shift detecting signal.

In one aspect of the present invention, an integration unit is provided in which the diffraction grating is divided into a plurality of diffraction gratings, wherein diffraction efficiency and an amount of change of diffraction efficiency are set for each of the diffraction gratings.

In one aspect of the present invention, an integration unit is provided in which the diffraction grating is divided into at least two parts to correspond to regions of the diffraction grating irradiated by the light beam, so that diffraction efficiency and an amount of change of diffraction efficiency can be set for each of the diffraction gratings.

Moreover, an optical pickup device of the present invention is realized by including any one of the foregoing light integration units, and object lens means for focusing, onto a disk, a laser beam emitted from the light integration unit.

With this configuration, as described above, it is possible to constitute the optical pickup device with a minimum necessary number of optical members. In addition, adjustment of the signal detecting system is no longer required. As a result, it is possible to obtain the optical pickup device that is small, thin, easy to assemble, and reliable, and that has stable tracking servo performance.

Moreover, the optical pickup device may include a $\lambda/4$ plate (¼ wave plate) between the object lens means and the optical pickup device. In this case, it is preferable that the light splitting element of the light integration unit includes a polarizing beam splitter.

Moreover, an optical disk device of the present invention includes the optical pickup device.

With the optical pickup device, owing to the stable tracking servo performance, it is possible to perform stable recording and reproduction using an information recording medium.

Moreover, an optical disk device of the present invention is an optical disk device including an optical pickup device that includes: a light emitting section for emitting a laser beam onto an information recording medium having a disk shape; an object lens for focusing the laser beam onto the information recording medium; a light splitting element for reflecting a reflected light beam from the information recording medium onto a hologram; a hologram for diffracting a light beam from the light splitting element onto a light receiving section; a light receiving section for receiving the light beam diffracted by the hologram; and an optical element, provided between the hologram and the light receiving section, whose transmittance varies in a disk radial direction, the optical disk device carrying out recording and reproduction by tracking based on a calculation of a signal supplied from the optical pickup device, the optical disk device being compatible with disks of different specifications by reversing a polarity of a coefficient used in the calculation of a tracking error signal.

With this configuration, it is possible to provide an optical disk device that is compatible with disks of different specifications without changing the configuration of the pickup, and that can reduce an offset caused by a shift of the object lens regardless of the type of disk in performing the recording and reproduction.

For a fuller understanding of the nature and advantages of the invention, reference should be made to the ensuring detailed description taken in conjunction with the accompanying drawings.

BRIEF DESCRIPTION OF DRAWINGS

FIG. 8 is a perspective view of a diffraction grating of a light integration unit in another embodiment of the present invention.

FIG. 9 is a perspective view of a diffraction grating of a light integration unit in yet another embodiment of the present invention.

FIG. 19 is a schematic block diagram illustrating an optical disk device of the present invention including an optical pickup device of the present invention.

BEST MODE FOR CARRYING OUT THE INVENTION

One embodiment of the present invention is described below with reference to the attached drawings.

Figure 1:
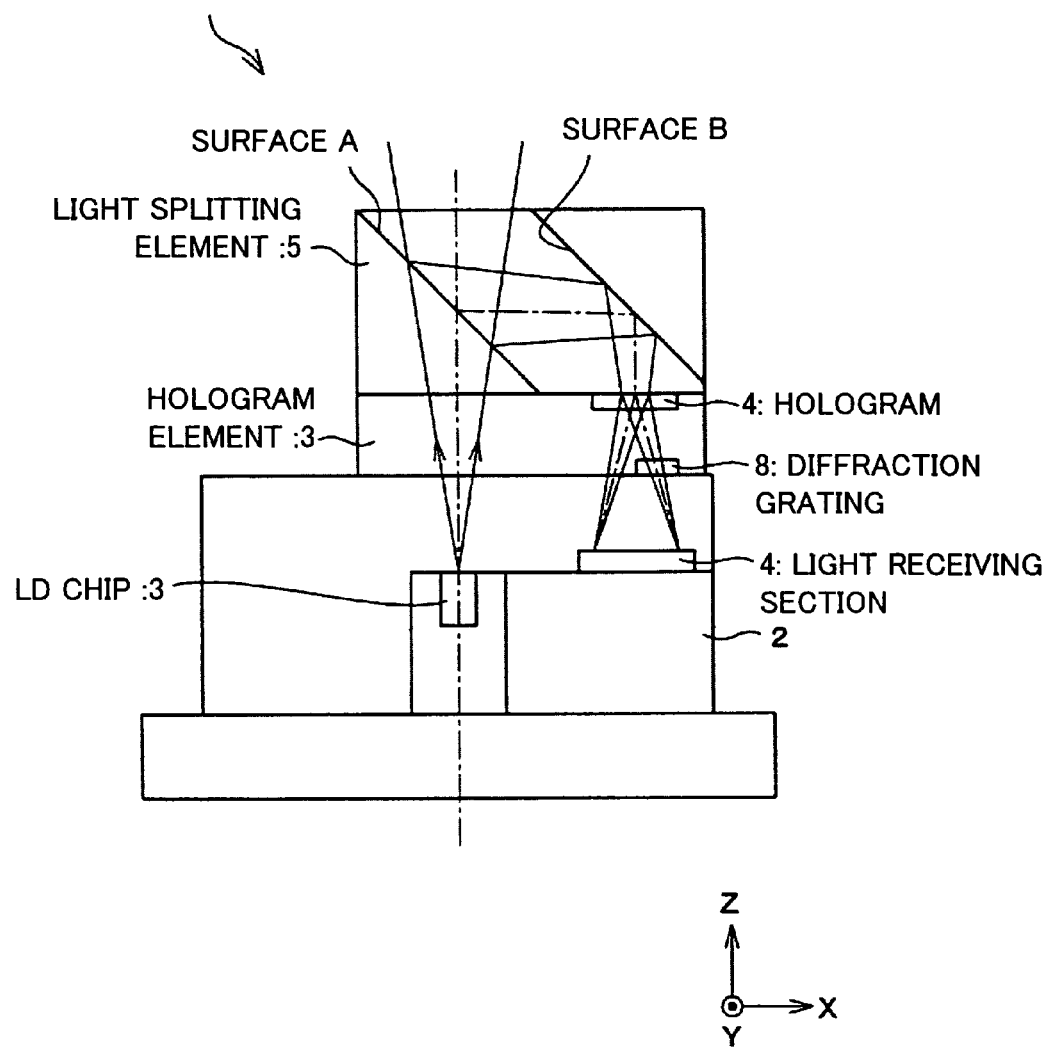
FIG. 1 is a schematic diagram illustrating a schematic configuration of a light integration unit in one embodiment of the present invention.

FIG. 1 is a cross-sectional view illustrating a schematic configuration of a light integration unit 1 of the present invention. The light integration unit 1 constitutes an optical pickup device for DVD, by being combined with an object lens means for focusing, onto a disk, a laser beam emitted from the light integration unit 1. Schematically, the light integration unit 1 includes an LD (Laser Diode) chip 3 mounted to a stem 2, a light receiving section 4, a light splitting element 5, and a hologram element 6.

The LD chip (light emitting section) 3 emits a laser beam onto, for example, a DVD (Digital Versatile Disc, Digital Video Disk), which is an information recording medium having a disk shape. The light splitting element 5 reflects, for example, reflected light from the DVD into a hologram 7 of the hologram element 6. The hologram 7 diffracts light from the light splitting element 5 into the light receiving section 4. The light receiving section 4 receives the light diffracted by the hologram 7.

Figure 2:
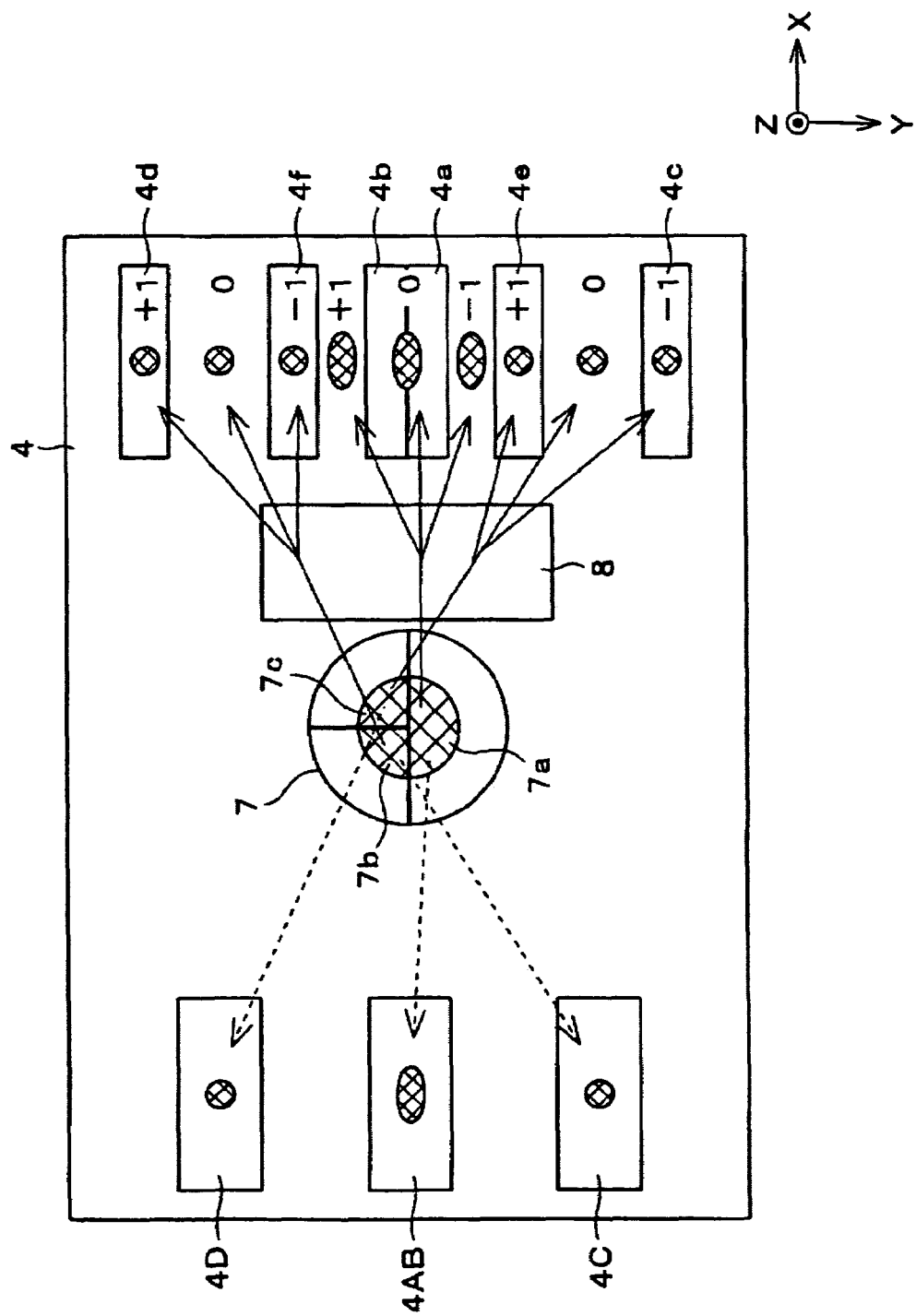
FIG. 2 is a plan view illustrating a relationship between hologram element, light receiving section, and shape of a hologram in the light integration unit shown in FIG. 1.

As shown in FIG. 2, the hologram 7 of the hologram element 6 is divided into two parts by a divisional line in a disk radial direction X. One of the two parts is further divided into two parts by a divisional line in a track direction Y. A divisional region 7a is made by dividing the hologram 7 in the disk radial direction X, and divisional regions 7b and 7c are made by dividing the hologram 7 in the track direction Y. Here, a one beam PP method is employed, in which a focus error signal in the reflected light from the disk is diffracted in the divisional region 7a, a track error signal in the reflected light from the disk is diffracted in the divisional regions 7b and 7c, and an information signal in the beam is diffracted on the entire area, and the focus error signal, the track error signal, and the information signal are detected by the light receiving section 4. The divisional regions 7a, 7b, and 7c are respectively provided with gratings that are different from each other.

Turning back to FIG. 1, the light emitted from the LD chip 3 passes through surface A of the light splitting element 5, and is incident on the disk. The reflected light from the disk is reflected by the surface A of the light splitting element 5, reflected further by surface B, and is incident on the hologram 7. Then, the light receiving section 4 receives the ±1st order components of the diffracted light from the hologram 7.

As shown in FIG. 2, the light receiving section 4 has light receiving regions 4a to 4f for receiving one of the ±1st order components of the diffracted light (in FIG. 2, the +1st order component) that was produced through the hologram 7 from the light incoming from the light splitting element 5. Among the light receiving regions 4a to 4f, the light receiving regions 4a and 4b are disposed substantially along the disk radial direction X with respect to the hologram 7. Further, the light receiving regions 4a and 4b are disposed adjacent to each other in the track direction Y. The light receiving regions 4c to 4d are disposed in front of and behind the light receiving regions 4a and 4b in the track direction Y. The light receiving region 4e is disposed between (i) the light receiving regions 4a and 4b and (ii) the light receiving region 4c, and the light receiving region 4f is disposed between (i) the light receiving regions 4a and 4b and (iii) the light receiving region 4d. Such a configuration is the same as the basic configuration of the light integration unit for DVD disclosed in Tokukaihei 9-161282.

What is noteworthy about the present invention is that, as shown in FIG. 1, the hologram element 6 includes a diffraction grating 8 provided on a reversed surface to the hologram 7. The diffraction grating 8 is so disposed that only one of the ±1st order components of the diffracted light (in FIG. 2, the +1st order component to the light receiving regions 4a to 4f is incident on the diffraction grating 8, the diffracted light being produced through the hologram 7 from the light incoming from the light splitting element 5. Specifically, the diffraction gating 8 (optical element) is disposed between the hologram 7 and the light receiving element 4. The diffraction gating 8 is disposed in a path of the reflected light from the disk. As described later, the transmittance of the diffraction gating 8 is varied in the disk radial direction.

Therefore, if there is no error in tracking and focusing, as shown in FIG. 2, among the +1st order component of the diffracted light through the divisional region 7a of the hologram 7, the zeroth order component transmitted through the diffraction grating 8 is incident on the light receiving regions 4a and 4b, whereas the −1st order component and the +1st component are incident outside the light receiving region 4a and outside the light receiving region 4b, respectively. Similarly, among the +1st order component of the diffracted light through the divisional region 7b of the hologram 7, the zeroth order component transmitted through the diffraction grating 8 is incident between the light receiving regions 4d and 4f, whereas a −1st order component and the +1st component are incident on the light receiving region 4f and the light receiving region 4d, respectively. Further, among the +1st order component of the diffracted light through the divisional region 7c of the hologram 7, the zeroth order component transmitted through the diffraction grating 8 is incident between the light receiving regions 4c and 4e, whereas the −1st order component and the +1st component are incident on the light receiving region 4c and the light receiving region 4e, respectively.

Here, the surface A of the light splitting element 5 is a polarizing beam splitter. A λ/4 plate is provided on an upper surface of the light splitting element 5. Then, the linearly polarized light emitted from the LD chip 3 is transmitted through the surface A with an approximately 100% transmittance, and becomes circularly polarized light through the λ/4 plate. Then, the circularly polarized light is incident on the disk. The reflected light from the disk is transmitted again through the λ/4 plate, and this time becomes linearly polarized light that is rotated 90°, thereby reflecting at the surface A with a 100% reflectance. This is more advantageous than a half mirror or the like in that the light emitted from the LD chip 3 can be made incident on the disk more efficiently, and that the reflected light from the disk can be guided to the hologram 7 more efficiently.

In the light receiving section 4, there are provided light receiving regions 4AB, 4C, and 4D for either one of the ±1st order components (in FIG. 2, the −1st order component) of the diffracted light through the light splitting element 5 and the hologram 7. The light receiving region 4AB is disposed in a direction opposite the disk radial direction X seen from the hologram 7. The light receiving regions 4C and 4D are disposed in front of and behind the light receiving region 4AB in the track direction Y.

Therefore, if there is no error in the tracking and focusing, as shown in FIG. 2, the −1st order component of the diffracted light from the divisional region 7a of the hologram 7 is incident on the light receiving region 4AB, the −1st order component of the diffracted light from the divisional region 7b is incident on the light receiving region 4C, and the −1st order component of the diffracted light from the divisional region 7c is incident on the light receiving region 4D. Thus, the light receiving section 4 has the light receiving regions 4a, 4b, 4c, 4d, 4e, and 4f for the +1st order component of the diffracted light through the hologram 7, and the light receiving regions 4AB, 4C, and 4D for the −1st order component of the diffracted light through the hologram 7. That is, the light receiving section 4 includes a light detector having nine segments, the light receiving regions 4a, 4b, 4c, 4d, 4e, 4f, and the light receiving regions 4AB, 4C, and 4D. As a result, it is possible to increase light utilization efficiency by utilizing both the +1st order component and the −1st order component of diffracted light.

The quantity of the zeroth order component through the hologram 7 and the quantity of the ±1st order components of the diffracted light through the hologram 7 can be controlled by a groove depth d of the diffraction grating. To put it in a simple equation, the hologram 7 is set to satisfy:

$$d \times (n-1) = (k+1/2)\lambda \quad (1)$$

In this condition, the quantity of the zeroth order component of the transmitted light can be set to zero, and the quantities of the ±1st order components of the diffracted light can be set approximately to 40%, respectively. Reflection occurs only on a surface of a grating substrate. Indicated by n is the refraction index of the grating substrate (grating substrate of the hologram 7), k is an integer, and λ is the wavelength of the light beam. The light utilization efficiency can be increased also by thus setting the quantity of the zeroth order component of the transmitted light substantially to zero.

Note that, FIG. 2 schematically shows a relationship between the hologram 7, the diffraction grating 8, and the light receiving section 4. In reality, the size of the hologram element 6 is approximately a three by three mm square to a four by four mm square, for example. The light receiving regions 4a to 4f and the light receiving regions 4AB, 4C, and 4D of the light receiving section 4 each measure approximately 50 μm×200 μm. The light receiving regions 4a to 4f and the light receiving regions 4AB, 4C, and 4D are located several hundred micro meters away from the center of the hologram 7.

In the light receiving section 4 of the foregoing configuration, supposing that the output signals from the light receiving regions 4a, 4b, 4c, 4d, 4e, 4f and the light receiving regions 4AB, 4C, and 4D are 5a, 5b, 5c, 5d, 5e, 5f, and 5AB, 5C, 5D, respectively, the focus error signal FES is given by:

$$FES = Sa - Sb \quad (2).$$

The information signal (RF signal) is given by:

$$RF = SAB + SC + SD \quad (3).$$

Of concern here is loss of light quantity of the light diffracted on the diffraction grating 8 as it passes through the diffraction grating 8, which reduces signal-to-noise ratio. However, in the foregoing configuration, the high-bandwidth signal (RF signal), which is the information signal, is received by the light receiving regions 4AB, 4C, and 4D, into which the high-bandwidth signal is not incident through the diffraction grating 8. Moreover, the servo signal, which does not require a high bandwidth, is received by the light receiving regions 4a, 4b, 4c, 4d, 4e, and 4f, into which the servo signal is incident through the diffraction grating 8. As a result, the RF signal, which requires a particularly high signal-to-noise ratio, can be obtained with no influence from the diffraction grating 8.

On the other hand, the track error signal TES is given by:

$$TES = (SD - SC) - \alpha \times ((Sa + Sb) - \beta \times (Sc + Sd + Se + Sf)) \quad (4).$$

Coefficients α and β are Described Later

Figure 3:
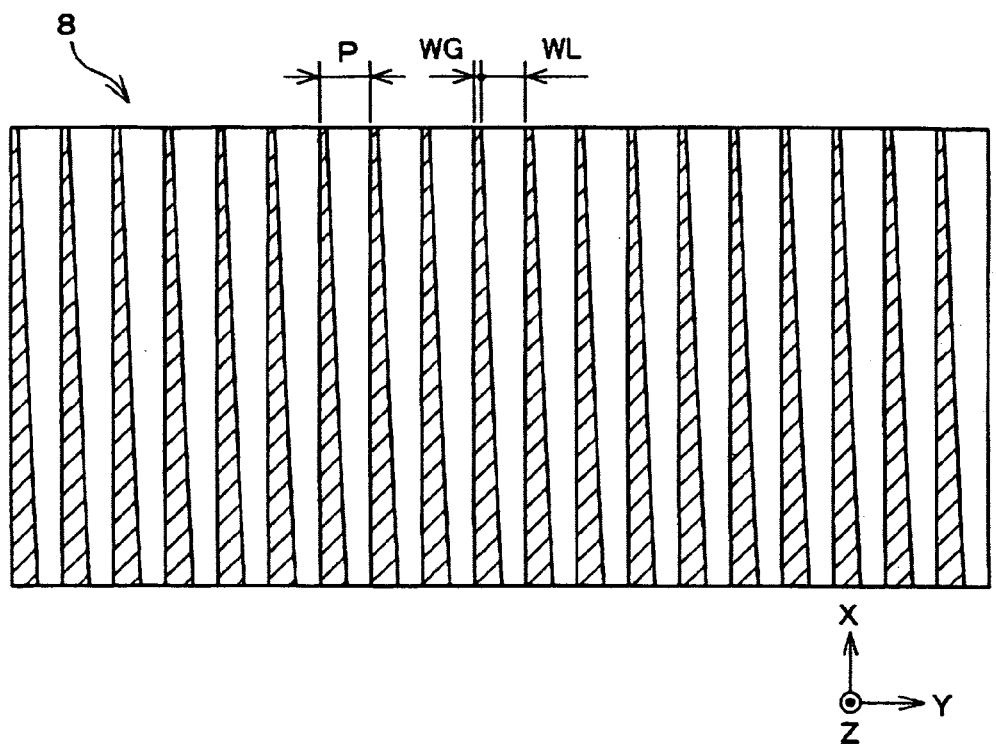
FIG. 3 is a front view of a diffraction grating in one embodiment of the present invention.

FIG. 3 illustrates an example of the diffraction grating 8. In the diffraction grating 8, as shown in FIG. 3, an intergrating pitch P is constant, whereas a duty, which corresponds to the ratio of a groove width WG to a land width WL, is varied in a grating longitudinal direction. The duty is varied continuously. The diffraction grating 8 is so disposed that the longitudinal direction thereof is parallel to the disk radial direction X. In FIG. 3, the groove region is shaded to merely distinguish it from the land region.

Specifically, the groove width WG of the diffraction grating 8 is wider toward the lower end in FIG. 3, with an increase in ±1st diffraction efficiency and a decrease in zeroth order efficiency. Conversely, the groove width WG of the diffraction grating 8 is narrower toward the upper end in FIG. 3, with a decrease in ±1st order diffraction efficiency and an increase in the zeroth order efficiency. That is, the diffraction efficiency of the diffraction grating 8 is varied in the grating longitudinal direction. The diffraction efficiency corresponds to transmittance.

Figure 20:
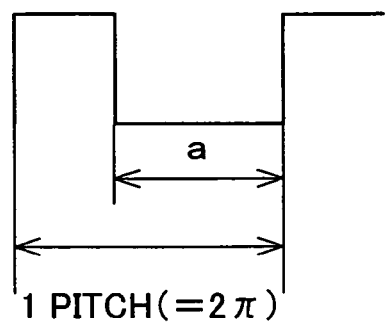
FIG. 20(a) is a schematic diagram illustrating a shape of a cross-section of one pitch of the diffraction grating.
FIG. 20(b) is a graph illustrating a change of zeroth order diffraction efficiency when a groove width is varied with respect to a one-pitch length of the diffraction grating.
FIG. 20(c) is a graph illustrating a change of first-order diffraction efficiency when the groove width is varied with respect to the one-pitch length of the diffraction grating.
Figure 20:
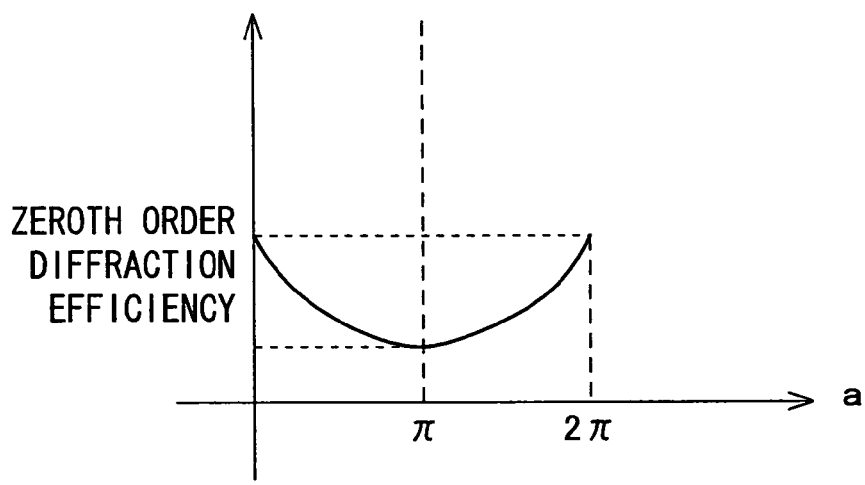
Figure 20:
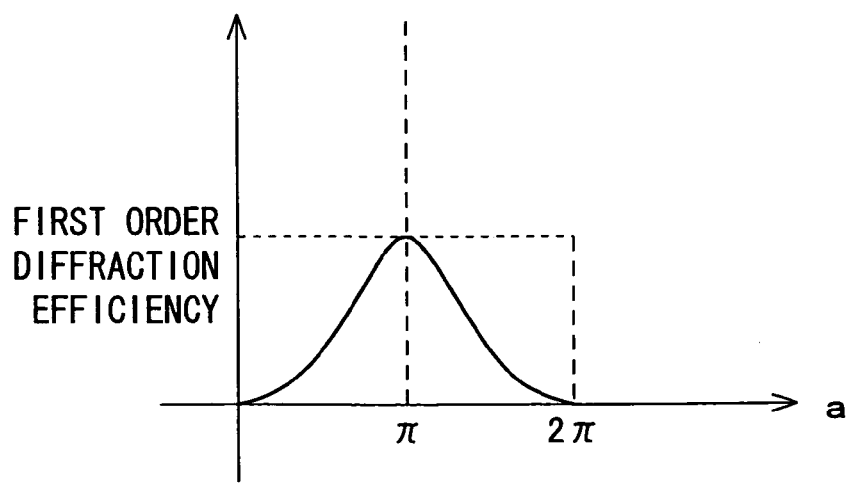

Here, a relationship between groove shape and diffraction efficiency is described with reference to FIG. 20. FIG. 20(a) illustrates a cross-section of a one-pitch groove of the diffraction grating 8. The groove width WG is denoted by "a", where a one-pitch length is $2\pi$. Here, as shown in FIG. 20(b), the zeroth order diffraction efficiency is given by:

$$\text{(zeroth order diffraction efficiency)} = (Q^2/\pi^2)(a-\pi)^2 - Q^2 + 1$$

where Q is a constant that depends on the diffraction index of the grating substrate, the grating groove depth, and a wavelength. On the other hand, as shown in FIG. 20(c), the first order diffraction efficiency is given by:

$$\text{(first order diffraction efficiency)} = (2Q^2/\pi^2)(1-\cos(a)).$$

Therefore, within a range of "a" from 0 to $\pi$, the zeroth order diffraction efficiency decreases as "a" increases, and the first order diffraction efficiency increases as "a" increases. Note that if $a=\pi$, the duty is 1:1. Within a range of "a" from $\pi$ to $2\pi$, the zeroth order diffraction efficiency increases as "a" increases, and the first order diffraction efficiency decreases as "a" increases.

With the foregoing configuration, if an object lens is misaligned in the disk radial direction X in performing tracking, a change is brought about in the diffraction efficiency of the diffraction grating 8. As described above, the change occurs inversely for the ±1st order components of the diffracted light and for the zeroth order component of the transmitted light. It can be seen from this that a shift amount of the object lens can be detected by separately detecting the ±1st order components of the diffracted light and the zeroth order component of the transmitted light, and by calculating the difference between the ±1st order components of the diffracted light and the zeroth order component of the transmitted light.

Figure 4:
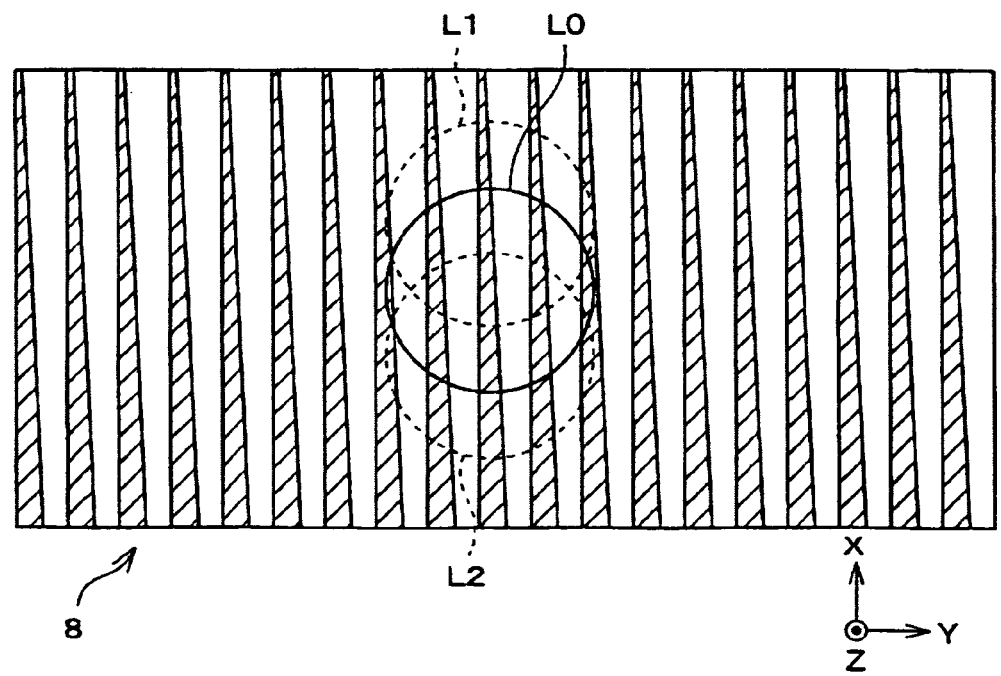
FIG. 4 is a front view illustrating how reflected light from a disk moves on the diffraction grating of FIG. 3 in response to displacement of an object lens or tilt of the disk.

For example, if the shift amount of the object lens is 0, as shown by the referential numeral L0 in FIG. 4, the coefficient $\beta$ is so set as to satisfy:

$$\text{(zeroth order transmission light)} - \beta \times \{(+1st \text{ order diffraction light}) + (-1st \text{ order diffraction light})\} = 0 \quad (5).$$

Then, if the left-hand side of Equation (5) is positive, it means that the zeroth order component of the transmitted light was increased, with the object lens shifting upward as shown by the referential numeral L1 in FIG. 4. On the other hand, if the left-hand side of Equation (5) is negative, it means that the zeroth order transmission light was decreased, with the object lens shifting downward as shown by the referential numeral L2 in FIG. 4. Here, (zeroth order transmission light) is Sa+Sb; (+1st order diffraction light) is Sd+Se; and (−1st order diffraction light) is Sc+Sf.

Turning back to Equation (4) for calculating the track error signal TES, the component (SD−SC) is a push-pull signal (PP signal), and the component after the coefficient $\alpha$ is an offset correcting signal for correcting an offset caused by a shift of the object lens. In the offset correcting signal, (Sc+Sd+Se+Sf) is a sum of the ±1st order components of the diffracted light, and (Sa+Sb) is a sum of the zeroth order components of the transmitted light. The offset correcting signal is used to calculate a shift amount of the object lens by taking a difference, as in the left-hand side of Equation 5. The coefficient $\beta$ is a coefficient for adjusting a difference between the diffraction efficiencies of the zeroth order transmission light and the ±1st order diffraction light, which is determined by the groove depth of the grating. The coefficient $\alpha$ is a coefficient for converting the shift amount of the lens into an offset amount in the PP signal.

The beam is displaced on the diffraction grating 8 in the disk radial direction X also due to a tilt of the disk in the disk radial direction X. It is therefore possible to detect a tilt amount in the same manner as the shift amount of the disk.

As described, the diffraction grating 8 for splitting the diffracted light of the hologram 7 into three beams is provided between the hologram 7 and the light receiving section 4. Moreover, the diffraction efficiency of the diffraction grating 8 is varied in the disk radial direction X. With this configuration, it is possible to suppress, using the one-beam system that involves no decrease in the amount of main beam, the offset caused by the shift of the object lens and the tilt of the disk, so that stable tracking servo performance can be attained. That is, the quantity of the main beam involved in recording is not decreased in the one-beam method, because a single beam generated from a single light source is emitted onto the disk. In the present embodiment, the offset can be suppressed by splitting the reflected light from the disk and, as described above, detecting the reflected light at a plurality of receiving regions.

The optical pickup device includes the light integration unit 1 and the lens means for focusing, onto the disk, the laser beam emitted from the light integration unit 1. With this configuration, it is possible to constitute the optical pickup device with a minimum necessary number of optical members. Moreover, the adjustment of the signal detecting system of the optical pickup device is no longer required. As a result, it is possible to obtain the optical pickup device that is small, thin, easy to assemble, and reliable, and that can obtain stable tracking servo performance.

The track error signal TES is also given by:

$$TES = (SD-SC) - \alpha' \times (SAB - \beta' \times (Sa+Sb)) \quad (6)$$

or $$TES = (SD-SC) - \alpha'' \times ((SC+SD) - \beta'' \times (Sc+Sd+Se+Sf)) \quad (7)$$

Note that $\alpha'$ and $\alpha''$ are coefficients similar to $\alpha$ in Equation (4), and $\beta'$ and $\beta''$ are coefficients similar to $\beta$ in Equation (4).

The terms after the coefficient $\alpha$ in Equation (4) calculate the difference between the zeroth order transmission light and the ±1st order diffraction light. Therefore, sensitivity is high for a shift of the object lens. On the other hand, in Equations (6) and (7), sensitivity is low since only one of the zeroth order diffraction light and the ±1st order diffraction light is used. However, the light receiving regions 4c to 4f are not required in Equation (6). This reduces the scale of an arithmetic circuit in the light integration unit 1, as well as the number of pins. Therefore, the light integration unit 1 can be further miniaturized.

To be specific, a modification example of the light receiving section 4 may have such a configuration as to include only the light receiving regions 4a and 4b. With this configuration, detection can be carried out using Equation (6).

Moreover, because Equations (6) and (7) use only one of the divisional regions 7a and 7b+7c (Equation (6) uses 7a, and Equation (7) uses 7b+7c), which are made by dividing the hologram 7 in the track direction Y, the unbalance, in the track direction Y, of the light beam that falls on the hologram 7 is less likely to have an influence.

For example, in a case where Equation (7) is used, since the ±1st order diffraction light from each of the light receiving regions 7b and 7c of the hologram 7 is used, stability is obtained against fluctuations of light quantity of the incident light. For example, it is possible to cancel the influence of fluctuations of light quantity caused when a position of the incident light beam on the hologram 7 is shifted in the Y-direction in FIG. 2.

The following describes a specific example where the diffraction grating described with reference to FIGS. 3 and 4 is applied to the light integration unit or the optical pickup of the present invention.

Figure 5:
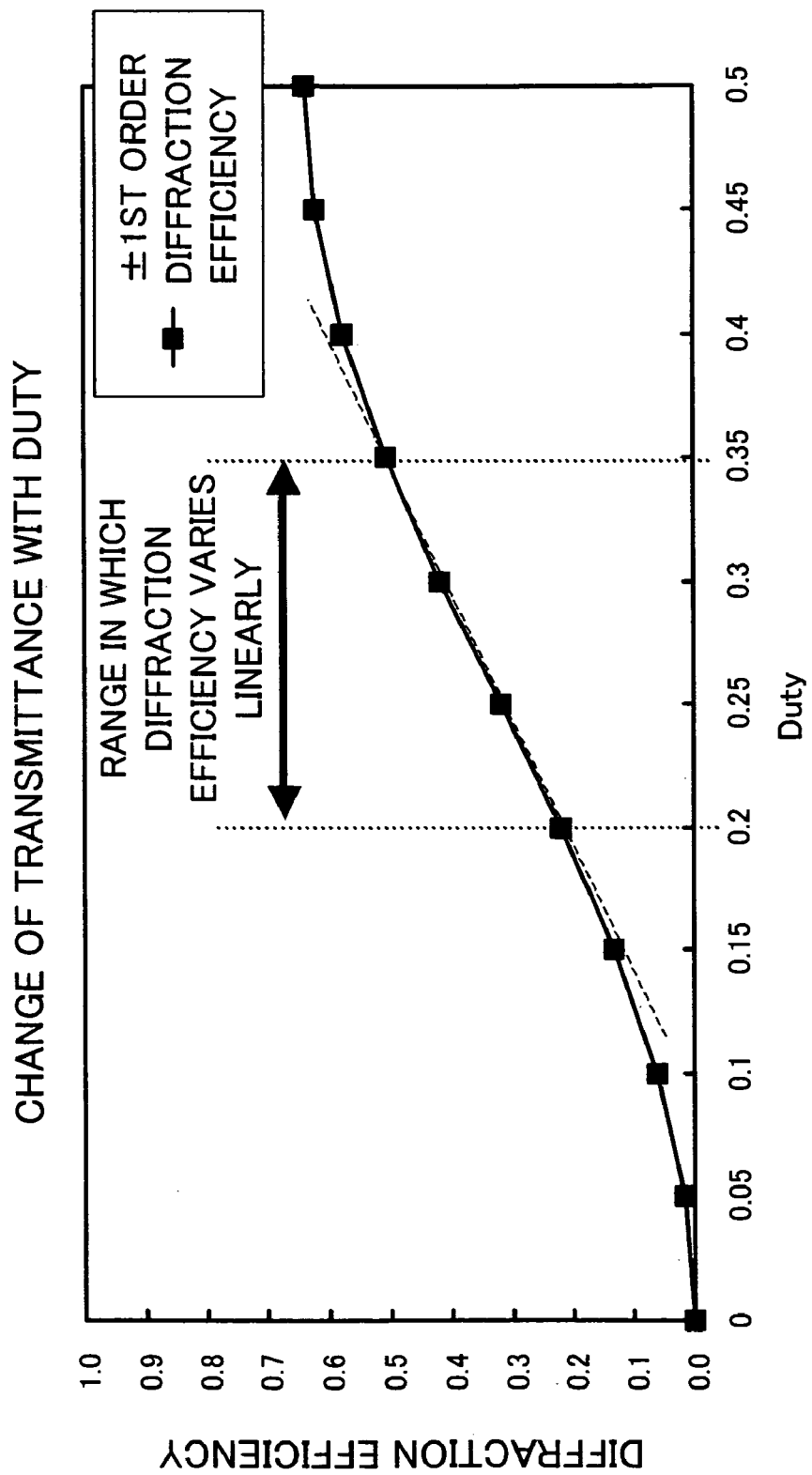
FIG. 5 is a graph representing a relationship between diffraction efficiency and duty of the diffraction grating of the present invention.

FIG. 5 shows a relationship between duty and a sum of the ±1st order diffraction efficiencies of the diffraction grating 8 in FIG. 3. Here, the duty of 0.5 indicates that the ratio of groove width to land width is 1:1. The duty of 0.2, for example, indicates that the ratio of groove width to land width is 0.2:0.8, that is, 1:4. Therefore, in FIG. 3, the groove width of the diffraction grating 8 is wider and the duty is greater toward the lower end.

In the duty range of 0 to 0.5, the sum of the ±1st order diffraction efficiencies increases as the duty increases. On the other hand, in the duty range of 0.5 to 1, the sum of the ±1st order diffraction efficiencies decreases as the duty increases. Therefore, the diffraction efficiencies are maximized when the duty is 0.5.

Here, it is found from FIG. 5 that the diffraction efficiencies are approximately proportional to duty within a duty range of 0.2 to 0.35, as shown by the dotted line in FIG. 5. Therefore, such a configuration is preferable in which the diffracted light from the hologram is projected onto a region of the diffraction grating 8 which has a duty corresponding to the portion of such excellent linearity. Such a diffraction grating that has excellent linearity is used because sensitivity for the shift of the object lens is low in a portion outside the linear portion.

However, if a range of duty change is from 0.2 to 0.35 as described above, there is a problem that an average sensitivity is decreased, although the sensitivity is not decreased. That is, although the diffraction efficiencies vary with a change in duty, sufficiently high diffraction efficiencies cannot be attained. Therefore, what is most preferable is to have as high linearity as possible for the relationship between duty and diffraction gratings. That is, it is preferable to expand the area of linearity in the relationship between duty and diffraction gratings. In this way, it is possible to attain high diffraction efficiencies.

Figure 7:
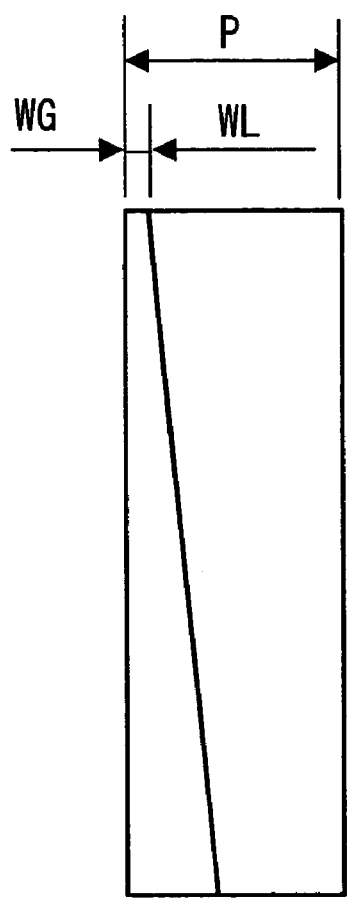
FIG. 7(a) is a front view of the diffraction grating of the present invention.
FIG. 7(b) is a front view of the diffraction grating of the present invention when the duty of the diffraction grating is varied non-linearly.
Figure 7:
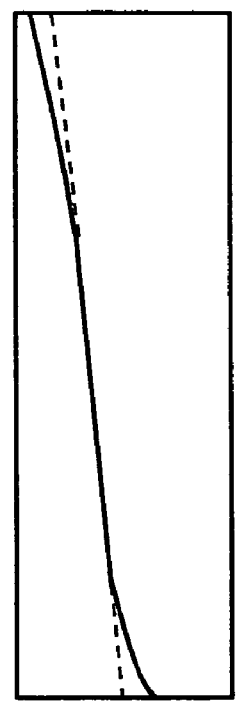

The duty of the diffraction grating 8 shown in FIG. 3 and FIG. 7(a) is linearly varied. However, the duty of the diffraction grating may be varied in a non-linear fashion to obtain a constant changing rate of the diffraction efficiencies of the diffraction grating over a wider area.

Figure 6:
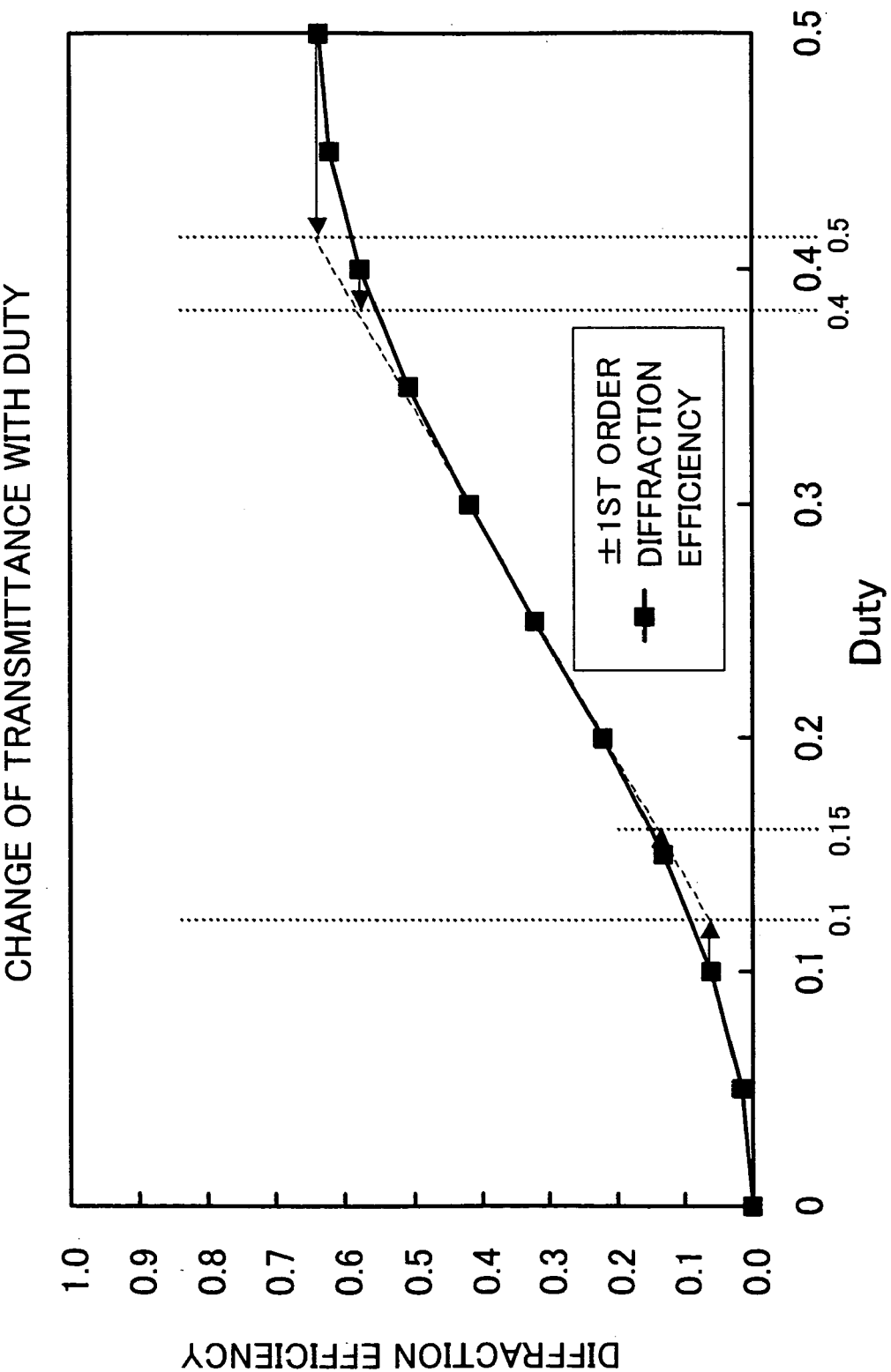
FIG. 6 is a graph in which linearity of diffraction efficiency and duty of the diffraction grating of the present invention is broadened.

FIG. 7(b) shows an example of such a diffraction grating whose duty is varied non-linearly. In the diffraction grating shown in FIG. 7(b), the duty is continuously varied non-linearly in the grating longitudinal direction. FIG. 6 shows a graph in which the diffraction efficiency of the diffraction grating shown in FIG. 7(b) is plotted against duty. Here, it is possible to linearly vary the diffraction efficiency within a duty range of 0.1 to 0.5, by non-linearly varying the duty within a duty range of 0.2 or less, and a duty range of 0.35 or more.

As described above, by non-linearly varying the duty of the diffraction grating, it is possible to expand an area in the diffraction grating where a constant changing rate can be obtained for diffraction efficiency. As a result, it is possible to obtain constant sensitivity for a shift of the object lens, and to increase average sensitivity.

Here, an example of an optical disk device of the present invention including the optical pickup device of the present invention is described.

As shown in FIG. 19, an optical disk device 15 includes an optical pickup device 16, a control section 19, a servo driving system 20, and a spindle motor 21.

The optical pickup device 16 generates a light beam, and detects reflected light from an optical disk D. The optical pickup device 16 includes a light integration unit 1, a λ/4 plate λ/4 wave plate) 17, and an object lens section 18. The light beam is emitted from the light integration unit 1 onto the optical disk D via the λ/4 plate 17 and the object lens section 18. The reflected light from the optical disk D is led to the light integration unit 1 via the object lens section 18 and the λ/4 plate 17. A signal detected by the light receiving section 4 of the light integration unit 1 is outputted to the control section 19.

The control section 19 controls the optical disk device 15. The control section 19 controls the optical pickup device 16, and reproduces, in accordance with a signal detected by the optical pickup device 16, information stored in the optical disk D. The information thus reproduced is transmitted to an external device (not shown), for example. Also, the control section 19 controls the servo driving system 20 in accordance with the tracking error signal and the focus error signal detected by the optical pickup device 16, so as to carry out position control for the light beam by performing tracking and focusing. The control section 19 is also capable of recording information into the optical disk D in accordance with externally inputted information, for example.

Furthermore, the control section 19 controls the spindle motor 21, so as to control a rotational speed of the optical disk D.

The servo driving system 20 adjusts the position of the optical pickup device 16 and the like in accordance with control commands from the control section 19, so as to adjust a focused position of the light beam.

The spindle motor 21 rotates the optical disk D at a rotational speed that is in accordance with control commands from the control section 19.

In the optical pickup device 16, the LD chip 3 of the light integration unit 1 generates a light beam in accordance with control commands from the control section 19, and emits the light beam onto the optical disk D. The optical pickup device 16 detects, and outputs to the control section 19, the information stored in the optical disk D, and the signals for performing tracking and focusing (tracking error signal and focus error signal).

More specifically, in order that the optical disk device 15 reproduces information stored in the optical disk D, the control section 19 rotates the spindle motor 21 at a predetermined rotational speed, and the servo driving system 20 adjusts the position of the optical pickup device 16 and the like. Then, a reproduction laser is emitted from the LD chip 3 of the optical pickup device 16. The optical pickup device 16 detects reflected light from the optical disk D, and the control section 19 reproduces information stored in the optical disk D. In this manner, the light beam is emitted onto the optical disk D while performing tracking and focusing, and while adjustment of the rotational speed is performed. In order to record information, the light beam from the LD chip 3 is emitted onto a desired position of the optical disk D.

As described, the optical pickup device 16 and the optical disk device 15, including the light integration unit 1, has stable tracking servo performance.

Another embodiment of the present invention is described below with reference to the attached drawings. Here, another embodiment of the diffraction grating is described. Configurations and functions similar to those described in the foregoing embodiment are labeled with the same referential numerals, and explanations thereof are omitted.

FIGS. 8 and 9 are perspective views illustrating diffraction gratings 11 and 12, which are another example of the diffraction grating in the light integration unit of the present invention described in the foregoing embodiment.

As shown in FIGS. 3 and 4, in the diffraction grating 8, the inter-grating pitch P is constant, and the duty, which is expressed by the groove width WG and the land width WL, is varied in the disk radial direction X (grating longitudinal direction) so that the diffraction efficiency is varied.

On the other hand, in the diffraction gratings 11 and 12, the inter-grating pitch P, the groove width WG and the land width WL are constant. Accordingly, the duty is constant, and the diffraction efficiency is varied by varying the groove depth from DT to DE along the grating longitudinal direction. The grating longitudinal direction is the disk radial direction X. In the diffraction grating 11 in FIG. 8, the groove depth is continuously varied from DT to DE. In the diffraction grating 12 in FIG. 9, the diffraction efficiency is varied stepwise from DT to DE.

The diffraction efficiencies of the diffraction gratings 11 and 12 vary in accordance with the groove depths. Therefore, as in the diffraction grating 8, the shift amount of the object lens and the tilt amount of the disk can be detected from Equation (5).

Whether to use the diffraction grating 8 or the diffraction gratings 11 and 12 may be decided according to the grating groove width (groove width WG). If the grating groove width is no less than 0.8 to 0.9 μm for example, the diffraction grating 8 may be used in which the ratio of land width to groove width is varied, because in this case the diffraction grating 8 can be produced by a simple process.

When the grating groove width is less than 0.8 to 0.9 μm, a large processing error is caused in the groove width by the present processing. Therefore, it is difficult to attain a desired transmittance. However, by using the diffraction gratings 11 or 12, in which the groove depth of the grating is varied, it is possible to attain a desired transmittance, because the groove depth can be processed with high precision, although the process is complex to some degree.

It should be noted that, if the processing is advanced as to reduce the processing error in the groove width, the diffraction grating 8 may be used even if the groove width is narrower than 0.8 to 0.9 μm.

Alternatively, the diffraction efficiency may be varied in a shift direction of the object lens by coating the diffraction grating with a thin film whose transmittance varies in the shift direction of the object lens. Therefore, the diffraction grating may be a diffraction grating coated with a thin film whose transmittance varies in one direction. However, the diffraction gratings 8, 11, and 12 can be produced by a simpler process than the thin film coating.

In the case where the diffraction efficiency is varied by varying the groove depth as shown in FIGS. 8 and 9, the groove depth may be varied non-linearly. In this case, as described above, it is possible to expand the area in the diffraction grating where a constant rate of change can be obtained for the diffraction efficiency, as in the case where the duty is varied non-linearly. As a result, it is possible to obtain constant sensitivity for a shift of the object lens, thereby increasing average sensitivity.

As described above, by non-linearly varying the duty or groove depth of the diffraction grating, it is possible to expand the area in the diffraction grating where a constant rate of change can be obtained for the diffraction efficiency, thereby increasing average sensitivity.

Next, yet another embodiment of the present invention is described. Here, configurations and functions similar to those described in the foregoing embodiments are labeled with the same referential numerals, and explanations thereof are omitted.

The average sensitivity can also be increased by dividing the diffraction grating 8 according to regions of the diffraction grating irradiated with the beams that were split and diffracted through the hologram 7 as shown in FIG. 1. Specific examples of this embodiment is described with reference to FIGS. 10(*a*) and 10(*b*).

Figure 10:
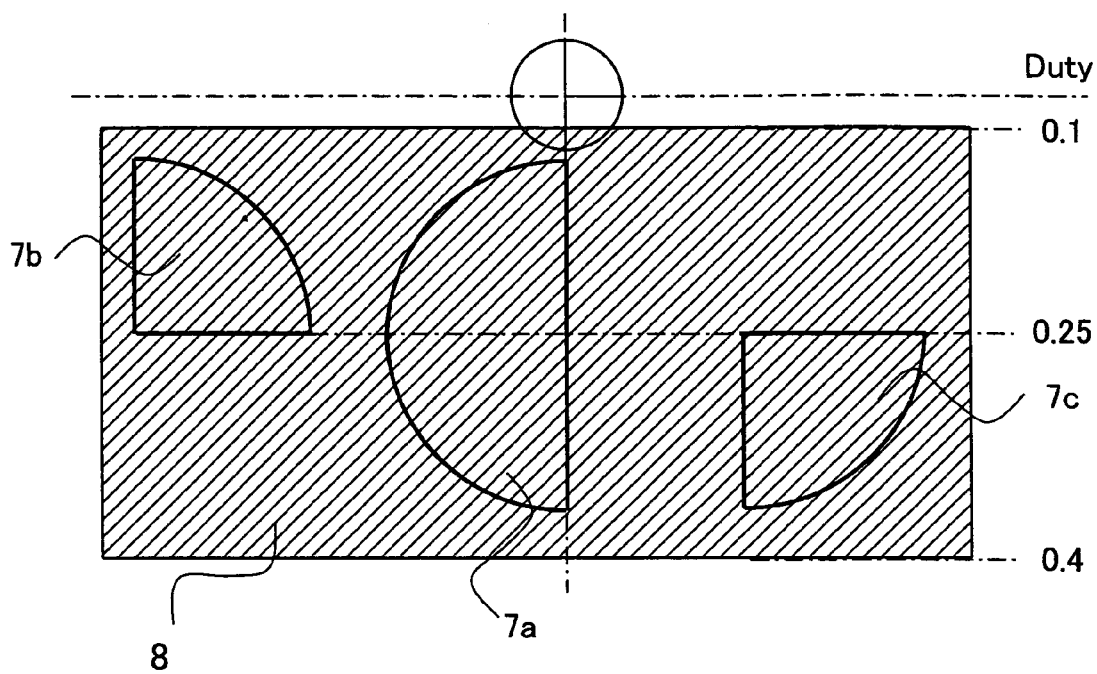
FIG. 10(a) is a plan view of a diffraction grating when a single diffraction grating is provided for a beam.
FIG. 10(b) is a plan view of a diffraction grating when a diffraction grating is divided according to the beam.
Figure 10:
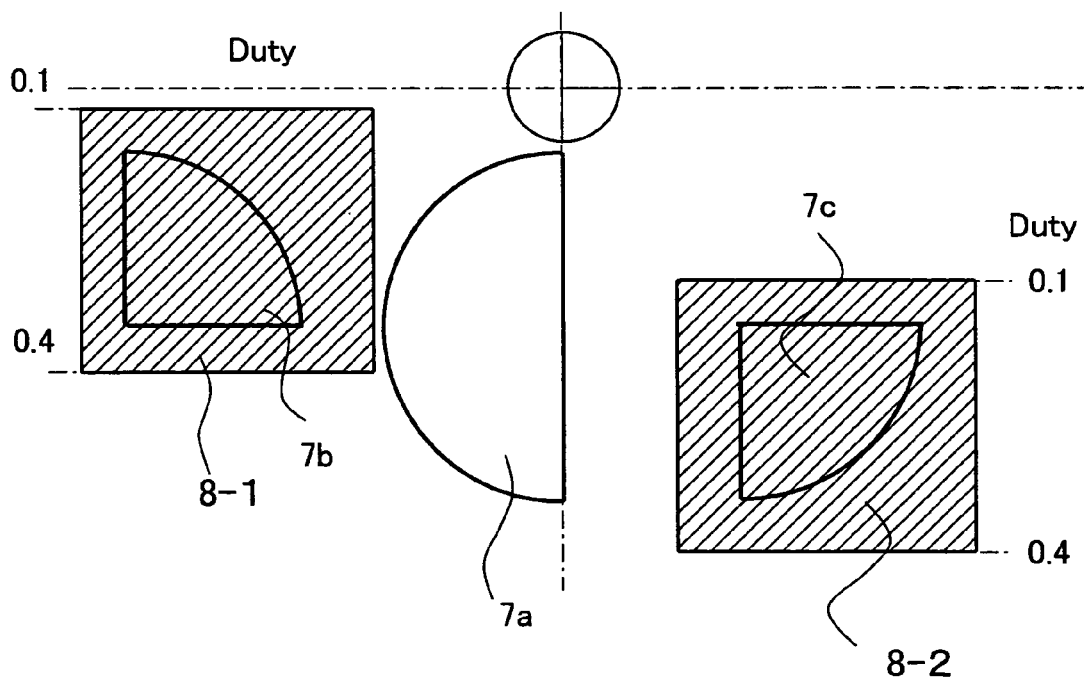

FIGS. 10(*a*) and 10(*b*) schematically illustrate beam profiles 7*a*, 7*b*, and 7*c* of the beams split and diffracted through the hologram 7 as shown in FIG. 1 according to the foregoing embodiments, when the beams are incident on the diffraction grating indicated by shades. Although FIG. 6 shows the case where the diffraction efficiency of the diffraction grating can be used linearly within a duty range of 0.1 to 0.5, the duty of the diffraction grating is varied between 0.1 and 0.4 in the present embodiment.

In FIG. 10(*a*), the diffraction grating is uniformly provided for one of the first order components of the light diffracted through the hologram. In FIG. 10(*b*), the diffraction grating is so divided as to correspond to the beams.

In the case where the diffraction grating is uniformly provided as shown in FIG. 10(*a*), only approximately a half of the variable range of the duty of the diffraction grating can be utilized by the beams 7*c* and 7*b* each having a quarter sector shape. Specifically, as indicated by the duty at the right end of FIG. 10(*a*), the beam 7*b* is within a duty range of 0.1 to 0.25, and the beam 7*c* is within a duty range of 0.25 to 0.4.

In this case, a change in diffraction efficiency in response to displacement of the beam in the grating longitudinal direction (vertical direction in FIG. 10(*a*)) is small. That is, sensitivity for a shift of the object lens is low.

Therefore, as shown in FIG. 10(*b*), the diffraction grating is divided into two parts, diffraction gratings 8-1 and 8-2, corresponding in position to the beams 7*b* and 7*c*, respectively. That is, the diffraction gratings 8-1 and 8-2 are divided regions along a direction perpendicular to the grating longitudinal direction. In other words, the diffraction gratings 8-1 and 8-2 are divided by a divisional line parallel to the grating longitudinal direction.

With this configuration, as indicated by the duty in the Figure, each beam can utilize the entire duty range of 0.1 to 0.4. Therefore, a change in diffraction efficiency in response to displacement of the beam is large. As a result, it is possible to increase sensitivity for a shift of the object lens.

Moreover, by dividing the diffraction grating into two, it is possible to set diffraction efficiencies of the diffraction gratings to be identical. Therefore, it is possible to set gains from both light receiving elements to be identical, thereby increasing light utilization efficiency.

In the configuration shown in FIG. 10(*b*) for example, a diffraction grating may or may not be provided at a position that corresponds to the beam profile 7a. If no diffraction grating is provided, the light receiving section 4 that satisfies Equation 7 is used, for example.

Figure 11:
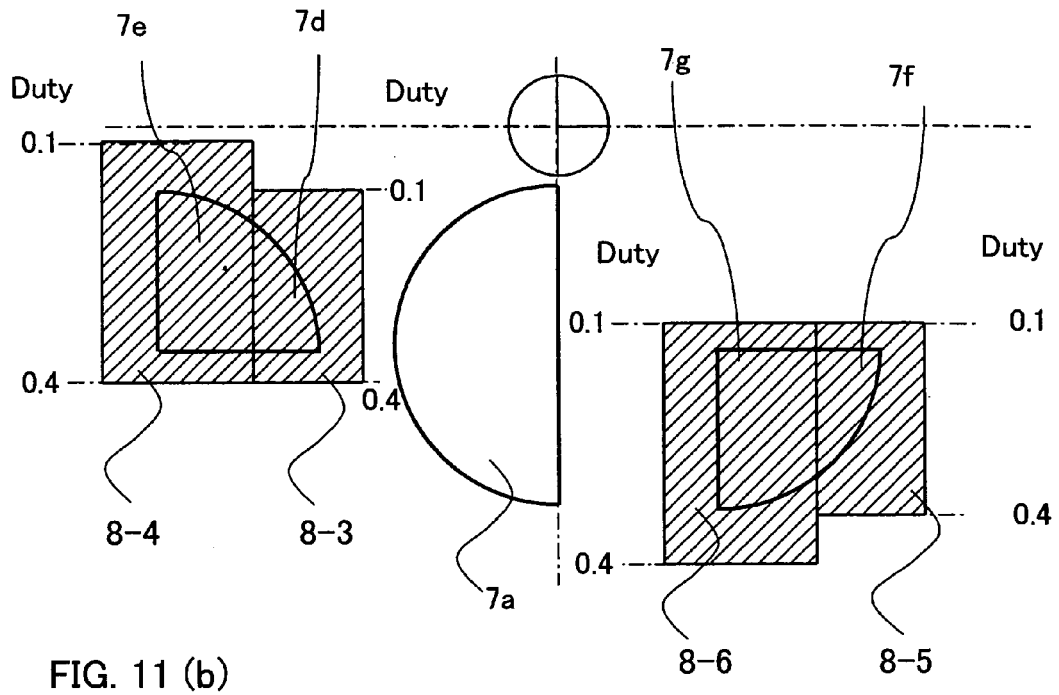
FIG. 11(a) is a plan view illustrating an example of a diffraction grating divided into two parts by a divisional line parallel to a grating longitudinal direction, and in which a rate of change of diffraction efficiency in the grating longitudinal direction is different in each diffraction grating.
FIG. 11(b) is a plan view illustrating a configuration of the diffraction gratings, each of which is additionally provided with diffraction gratings whose diffraction efficiency is constant in the grating longitudinal direction.
Figure 11:
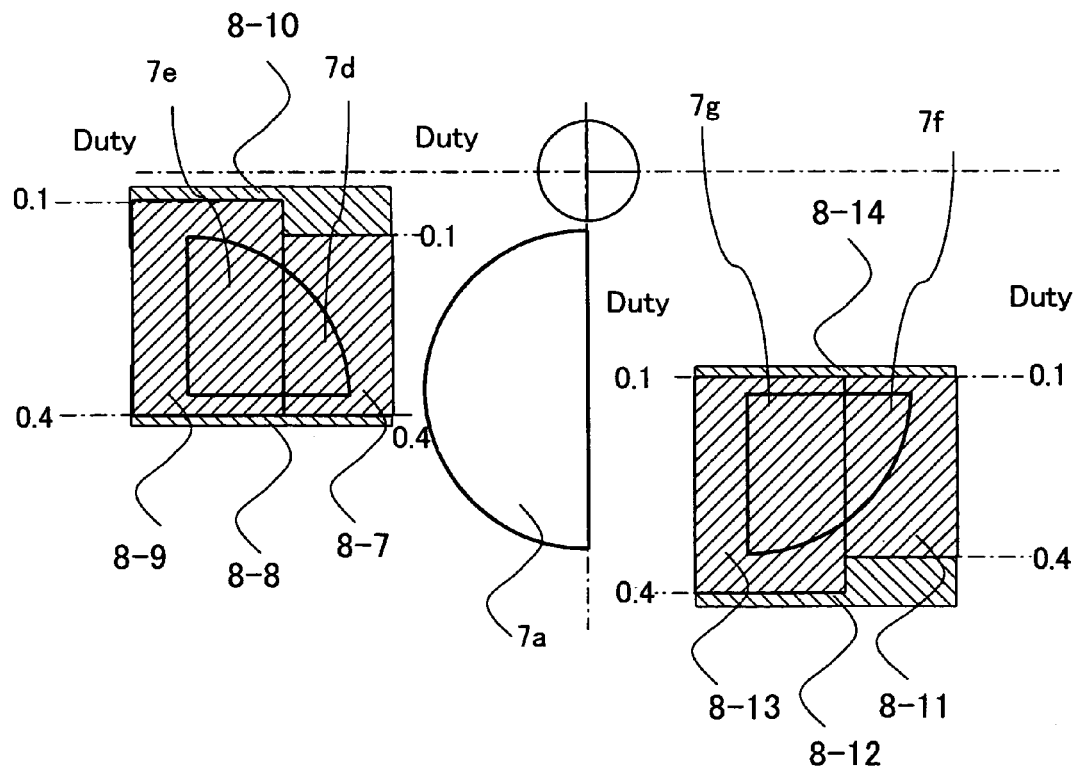

FIGS. 11(a) and 11(b) schematically illustrate beam profiles (7a, 7d, 7e, 7f, and 7g) of the beams split and diffracted through the hologram 7, when the beams are incident on the diffraction gratings.

As shown in FIG. 11(a), the diffraction grating of the present invention may be diffraction gratings 8-3, 8-4, 8-5, and 8-6, the diffraction gratings 8-3 and 8-4 being made by dividing the diffraction grating 8-1 in FIG. 10(b) by a divisional line parallel to the grating longitudinal direction, and the diffraction gratings 8-5 and 8-6 being made by dividing the diffraction grating 8-2 in FIG. 10(b) by a divisional line parallel to the grating longitudinal direction. Here, the beam profiles 7d and 7e are regions in the diffraction gratings 8-3 and 8-4, respectively, corresponding to the beam profile 7b in FIG. 10(b). The beam profiles 7f and 7g are regions in the diffraction gratings 8-5 and 8-6, respectively, corresponding to the beam profile 7c in FIG. 10(b).

Here, the beams 7d and 7e have different sizes in the grating longitudinal direction. Therefore, the diffraction grating 8-3 is shortened in the grating longitudinal direction, so as to correspond to the beam profile 7d. The duty of the diffraction grating 8-3 is varied between 0.1 and 0.4 in the grating longitudinal direction.

As described above, the diffraction gratings 8-3 and 8-4 are divided regions along a direction perpendicular to the grating longitudinal direction. In other words, the diffraction gratings 8-3 and 8-4 are divided in a direction parallel to the grating longitudinal direction. The diffraction gratings 8-3 and 8-4 have different rates of change of diffraction efficiency in the longitudinal direction of the grating. The duties of the diffraction gratings 8-3 and 8-4 continuously vary in the grating longitudinal direction for example, so that the diffraction efficiencies are varied continuously.

The duties of the diffraction gratings 8-3 and 8-4 are 0.4 at the identical position in the grating longitudinal direction. This provides more tolerance for the beam 7d when it is displaced in the grating longitudinal direction.

Likewise, the beams 7f and 7g have different sizes in the grating longitudinal direction. Therefore, the diffraction grating 8-5 is shortened in the grating longitudinal direction, so as to correspond to the beam profile 7f. The duty of the diffraction grating 8-5 varies between 0.1 to 0.4 in the grating longitudinal direction.

As described above, the diffraction gratings 8-5 and 8-6 are divided regions along a direction perpendicular to the grating longitudinal direction. In other words, the diffraction gratings 8-5 and 8-6 are divided in a direction parallel to the grating longitudinal direction. The diffraction gratings 8-5 and 8-6 have different rates of change of diffraction efficiency in the longitudinal direction of the grating. The duties of the diffraction gratings 8-5 and 8-6 continuously vary in the grating longitudinal direction for example, so that the diffraction efficiencies are varied continuously.

The duties of the diffraction gratings 8-5 and 8-6 are 0.1 at the same line in the grating longitudinal direction. This provides more tolerance for the beam 7f when it is displaced in the grating longitudinal direction.

With the configuration above, the duty can vary over the entire range of 0.1 to 0.4 even for the beams 7d and 7f shown in FIG. 11(a). Therefore, the diffraction efficiency can vary over a wider range in response to the displacement of the beam in the longitudinal direction of the grating, thereby further increasing sensitivity for a shift of the object lens.

Moreover, as shown in FIG. 11(b), diffraction gratings 8-8, 8-10, 8-12, and 8-14, whose diffraction efficiencies are constant, may be provided in the configuration shown in FIG. 11(a). That is, the diffraction gratings 8-8, 8-10, 8-12, and 8-14, whose diffraction efficiencies are constant, may be provided when the diffraction gratings are shortened in the grating longitudinal direction to correspond to the beams 7d, 7e, 7f, and 7g and thereby to further increase sensitivity for a shift of the object lens.

For example, the diffraction gratings 8-8 and 8-10 are divided for the diffraction gratings 8-7 and 8-9 in a direction perpendicular to the grating longitudinal direction. The diffraction gratings 8-12 and 8-14 are divided for the diffraction gratings 8-11 and 8-13 in a direction perpendicular to the grating longitudinal direction.

Here, the duties of the diffraction gratings 8-10 and 8-14 are 0.1 for example, and the duties of the diffraction gratings 8-8 and 8-12 are 0.4 for example. This ensures that the light beams are transmitted through the diffraction gratings even when the beams 7d, 7e, 7f, and 7g are displaced in the grating longitudinal direction. In other words, it is ensured that the light beams pass through the diffraction gratings. Therefore, with the light receiving section 4 satisfying Equation (7) for example, it is possible to reduce fluctuations in (Sc+Sd+Se+Sf) of (SC+SD)−β×(Sc+Sd+Se+Sf), which follows the second term a in Equation (7). This reduces fluctuations of an optimum value of β, thereby suppressing a TES offset.

Figure 12:
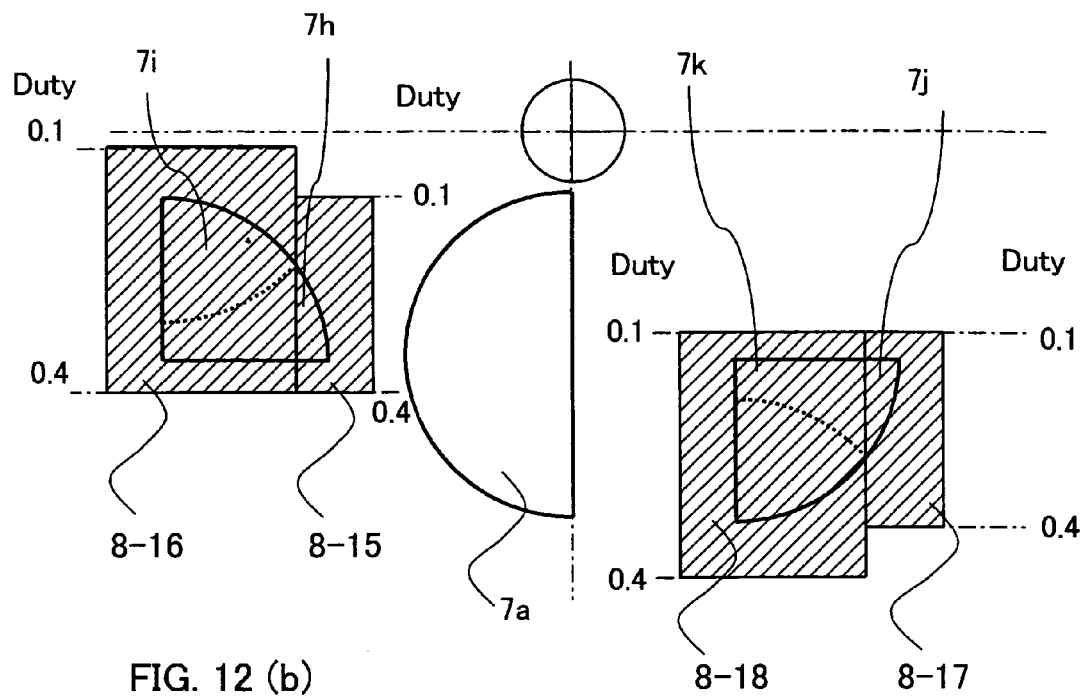
FIG. 12(a) is a plan view of diffraction gratings, illustrating positions of divisional lines when each diffraction grating is divided into two parts in a direction parallel to the grating longitudinal direction.
FIG. 12(b) is a plan view illustrating diffraction gratings, each of which is divided into plural parts.
Figure 12:
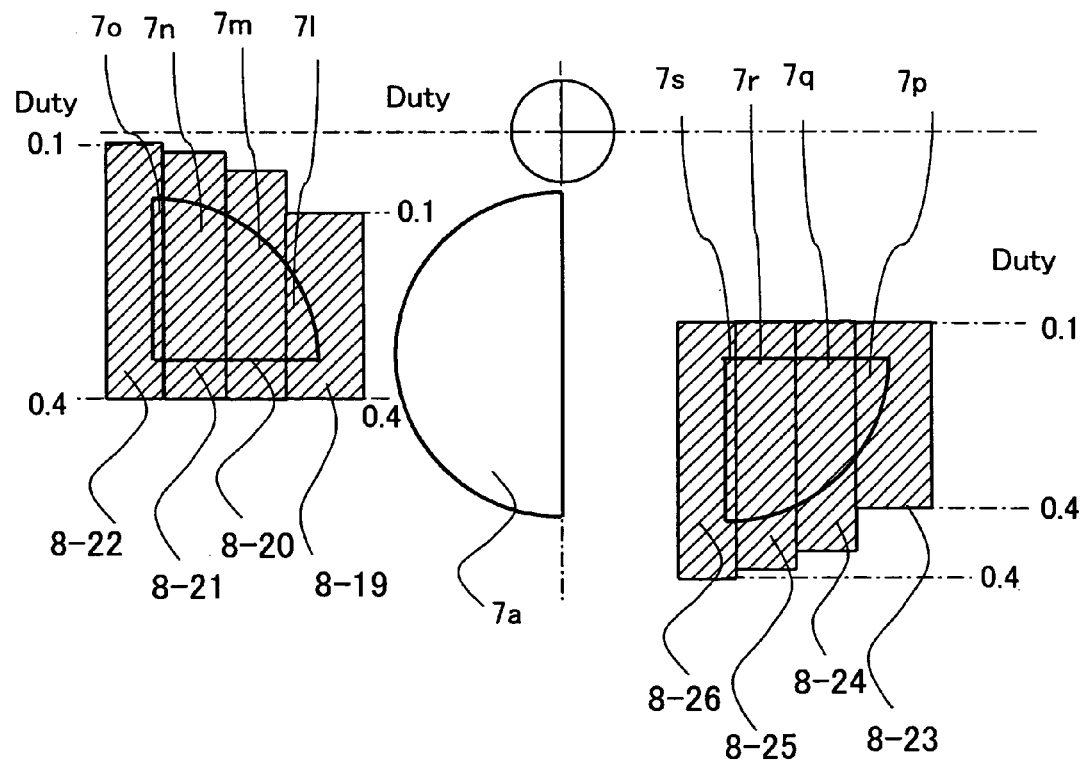

FIG. 12(a) schematically illustrates beam profiles (7a, 7h, 7i, 7j, and 7k) when the beams split and diffracted through the hologram 7 are incident on the diffraction gratings.

FIGS. 21(a) to 21(e) more specifically illustrate this.

Figure 21:
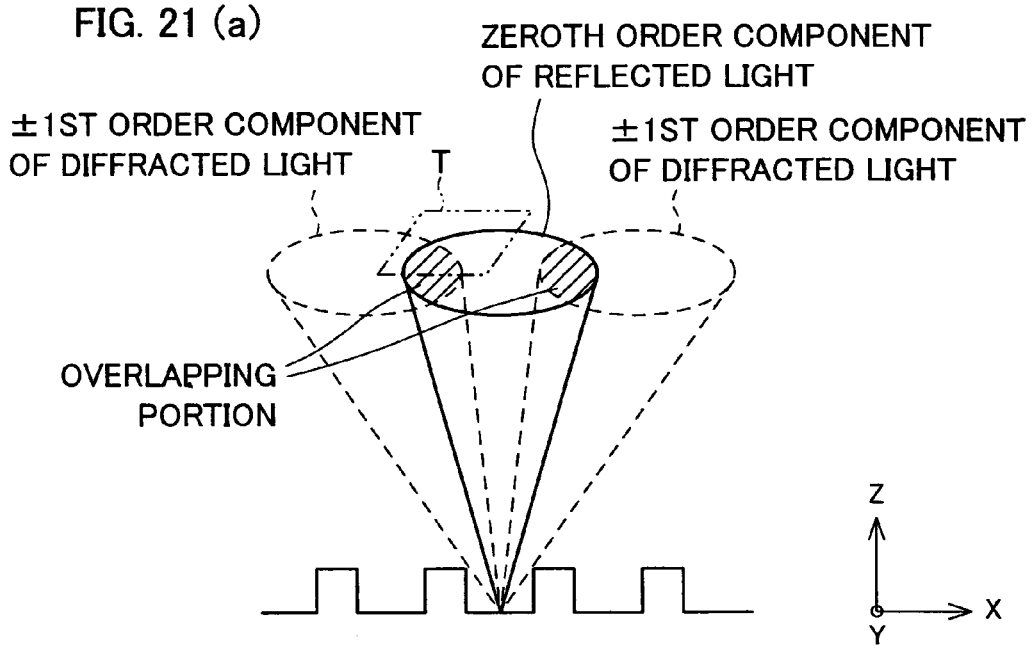
FIG. 21(a) is an explanatory diagram for specifically explaining a configuration of FIG. 12(a)
FIG. 21(b) is a plan view illustrating one example of a beam profile in the foregoing configuration.
FIG. 21(c) is a plan view illustrating another example of a beam profile in the foregoing configuration.
FIG. 21(d) is a plan view illustrating one example of a diffraction grating in which a beam having the beam profile of one example is incident.
FIG. 21(e) is a plan view illustrating another example of the diffraction grating in which a beam having the beam profile of another example is incident.
Figure 21:
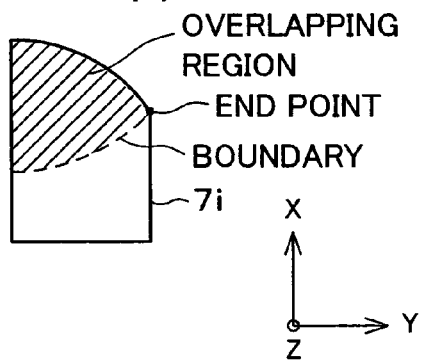
Figure 21:
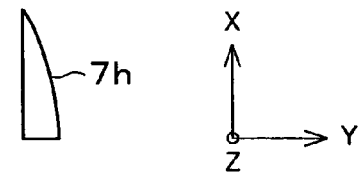
Figure 21:
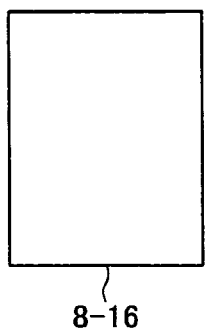
Figure 21:
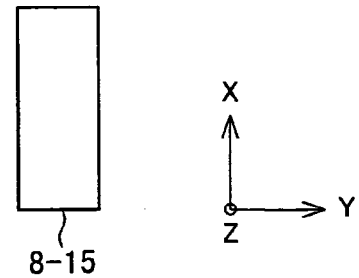

As shown in FIG. 21(a), the light beam diffracted on the disk contains regions on an imaginary plane T where the zeroth order component of the reflected light and ±1st order components of the diffracted light overlap. The reflected light with such overlap regions is incident on the diffraction grating from the light splitting element 5 via the hologram 7.

Here, as shown in FIG. 21(b), a region 7i indicates a profile of a beam incident on a region 8-16 shown in FIG. 21(d). In FIG. 21(b), a shaded region is an overlapping region where the zeroth order component of the reflected and the ±1st order components of the diffracted light overlap. A boundary of the overlapping region is indicated by a dotted line. An end point of the boundary of the overlapping region is indicated by a black dot. Regions 7k and 8-18 are similar to the regions 7i and 8-16, respectively.

FIG. 21(c) shows a beam profile 7h of a beam incident on a region 8-15 shown in FIG. 21(e). Here, the region 8-15 does not have an overlapping region where the zeroth order component of the reflected light and the ±1st order component of the diffracted light overlap. Regions 7j and 8-17 are similar to the regions 7h and 8-15, respectively.

As shown in FIG. 12(a), the divisional lines parallel to the grating longitudinal direction are so positioned that, when a light beam is emitted onto the disk, the diffraction gratings 8-15 and 8-17 do not have overlapping regions where the zeroth order component of the reflected and diffracted light and the ±1st order component of the diffracted light overlap. Specifically, the divisional lines are positioned on the end points of the boundaries of the overlapping regions where the zeroth order component of the diffracted light and the ±1st order component of the diffracted light overlap.

That is, the diffraction grating is divided in such a manner as to provide the diffraction gratings 8-15 and 8-16, or 8-17 and 8-18, so that one of the diffraction gratings contains a region of overlap of the zeroth order component and the ±1st order components of the diffracted light, while the other does not.

With this configuration, an overall diffraction efficiency (=Σ(Δarea×diffraction efficiency corresponding to Δarea of the diffraction grating)) of a portion of the diffraction grating 8-16 transmitting a region of overlap of the zeroth order component of the reflected and diffracted light and the +1st order component of the diffracted light when the light beam is emitted onto the disk is substantially equal to an overall diffraction efficiency (Δarea×diffraction efficiency corresponding to Δarea of the diffraction grating) of a portion of the diffraction grating 8-18 transmitting a region of overlap of the zeroth order component of the reflected and diffracted light and the −1st order component of the diffracted light when the light beam is emitted onto the disk.

This reduces a residual PP-component in (SC+SD)−β×(Sc+Sd+Se+Sf), which follows the second term a in Equation (7). As a result, the amplitude fluctuations of a PP-signal included in TES are less than that of a PP-signal included in (SD−SC), which is a main push-pull signal.

The coefficient α is a coefficient for converting an amount of lens shift into an amount of offset in the PP signal. If sensitivity for a shift of the object lens is increased, a value of a becomes relatively smaller.

Therefore, even if there is a residual PP-component in (SC+SD)−β×(Sc+Sd+Se+Sf), which follows the second term α in Equation (7), it is possible to reduce the influence of the residual PP-component causing fluctuations in the amplitude of the PP-signal included in TES, because the value of a is small.

This prevents the PP-signal amplitude included in TES from decreasing, thereby preventing the signal-to-noise ratio from decreasing. As a result, it is possible to provide an optical pickup device having stable tracking servo performance.

The foregoing described a configuration in which, for example, the diffraction gratings 8-1 and 8-2 shown in FIG. 10(b) are divided regions in a direction perpendicular to the grating longitudinal direction. However, the present invention is not limited to this configuration. The number of divisions in a direction perpendicular to the grating longitudinal direction may be increased. In this case, it is possible to further increase sensitivity for the shift of the object lens.

FIG. 12(b) schematically illustrates beam profiles (7a, 7l, 7m, 7n, 7o, 7p, 7q, 7r, and 7s) when the beam split and diffracted through the hologram 7 is incident on the diffraction gratings.

As shown in FIG. 12(b), diffraction gratings 8-19, 8-20, 8-21, 8-22 are so disposed as to correspond to the beam profiles of the beams 7l, 7m, 7n, and 7o, respectively. Diffraction gratings 8-23, 8-24, 8-25, and 8-26 are so disposed as to correspond to the beam profiles of the beams 7p, 7q, 7r, and 7s, respectively. The beam profiles 7l, 7m, 7n, and 7o are regions that correspond to the beam profile 7b in FIG. 10(b), and that are included in the diffraction gratings 8-19, 8-20, 8-21, and 8-22, respectively. The beam profiles 7p, 7q, 7r, and 7s are regions that correspond to the beam profile 7c in FIG. 10(b), and that are included in the diffraction gratings 8-23, 8-24, 8-25, and 8-26, respectively.

As shown in the Figure, the size of the beam is different for the beam profiles 7l, 7m, 7n, and 7o in the grating longitudinal direction. Therefore, the diffraction gratings 8-19, 8-20, 8-21, and 8-22 have different lengths in the grating longitudinal direction, so as to correspond to their respective beam profiles. The duty of each diffraction grating thus having a different length varies between 0.1 and 0.4 in the grating longitudinal direction.

Likewise, the size of the beam is different for the beam profiles 7p, 7q, 7r, and 7s in the grating longitudinal direction. Therefore, the diffraction gratings 8-23, 8-24, 8-25, and 8-26 have different lengths in the grating longitudinal direction, so as to correspond to their respective beam profiles. The duty of each diffraction grating thus having a different length varies between 0.1 and 0.4.

Thus, the diffraction gratings 8-19, 8-20, 8-21, and 8-22, and 8-23, 8-24, 8-25, and 8-26 are so divided as to correspond to regions of the diffraction gratings irradiated by the light beam. The diffraction efficiency and an amount of change of diffraction efficiency are set for each diffraction grating.

Therefore, a change in diffraction efficiency in response to displacement of the beam in the grating longitudinal direction is greater, thereby further increasing sensitivity for a shift of the object lens.

Even if the number of divisions in a direction perpendicular to the grating longitudinal direction is increased as shown in FIG. 12(b), the diffraction gratings can have a constant diffraction efficiency as shown in FIG. 11(b).

Further, when the number of divisions in a direction perpendicular to the grating longitudinal direction is increased as shown in FIG. 12(b), an overall diffraction efficiency of a portion of the diffraction grating transmitting a region of overlap of the zeroth order component and the +1st order component of the reflected and diffracted light when the light beam is emitted onto the disk in the manner shown in FIG. 12(a) may be substantially equal to an overall diffraction efficiency of a portion of the diffraction grating transmitting a region of overlap of the zeroth order component and the −1st order component of the reflected and diffracted light when the light beam is emitted onto the disk.

Next, a further embodiment of the present invention is described.

In the following, description is made as to the optical disk device when it uses the light integration unit employing a one-beam method for compensating for an offset caused when the object lens shifts. Specifically, described below is a configuration that takes into consideration disk compatibility. Here, members with configurations and functions similar to those in the foregoing embodiment are labeled with the same referential numerals, and explanations thereof are omitted.

Classified broadly, DVD-R/RW disks and DVD-RAM disks are two major examples of recordable optical disks. A significant difference between DVD-R/RW disks and DVD-RAM disks is the shape of guiding grooves.

Figure 13:
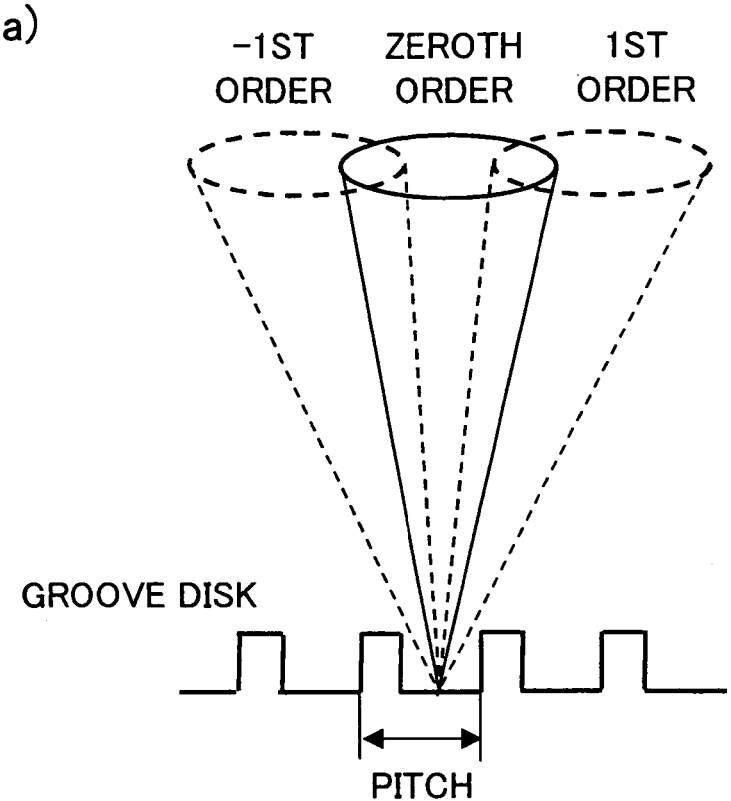
FIG. 13(a) is an explanatory diagram illustrating reflected light at a guiding groove of a DVD-R disk, which is a recordable optical disk.
FIG. 13(b) is an explanatory diagram illustrating reflected light at a guiding groove of a DVD-RAM disk, which is a recordable optical disk.
Figure 13:
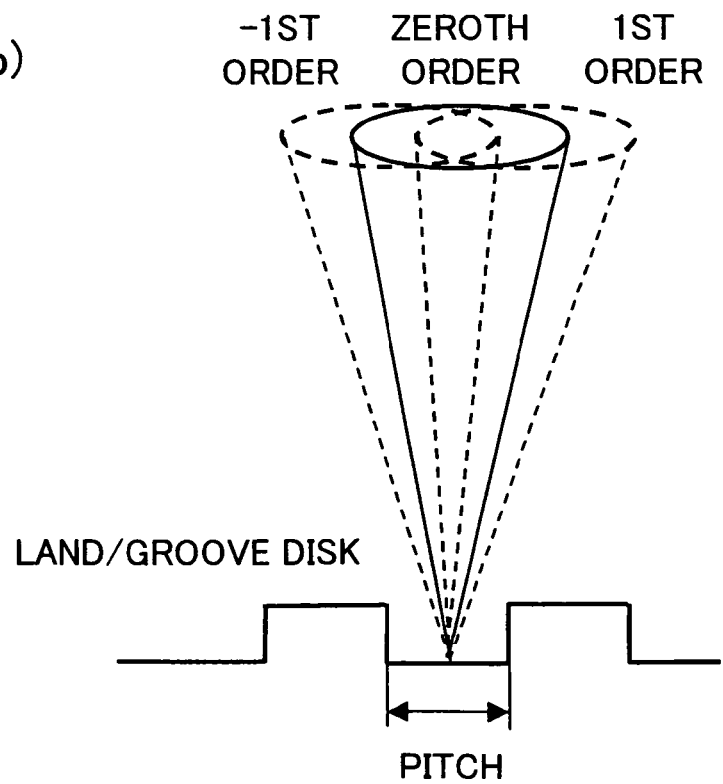

FIG. 13(a) illustrates a groove shape of the DVD-R/RW disk, showing reflected and diffracted light of a light beam projected on the optical disk. FIG. 13(b) illustrates a groove shape of the DVD-RAM disk, showing reflected and diffracted light of a light beam projected on the optical disk.

As shown in FIG. 13(a), the DVD-R/RW disk has a guiding groove whose width is slightly wider than one-half of a pitch. The DVD-R/RW disk is a groove disk that records information only in grooves.

On the other hand, as shown in FIG. 13(b), the DVD-RAM disk has a groove width and a land width of an approximately 1:1 ratio. The DVD-RAM disk is a land/groove disk that records information in lands and grooves.

Therefore, even though pitches are the same, the DVD-R/RW disk and the DVD-RAM disk have significantly different groove widths. Therefore, these two types of optical disks have different reflection and diffraction patterns.

More specifically, the DVD-RAM disk, having a larger pitch as shown in FIG. 13(b), reflects and diffracts light to produce ±1st order components that are overlapped, as shown in FIG. 13(b).

Accordingly, the diffraction grating must have different optimal values to be suitable for the present invention.

However, in practical use, it is very difficult to change diffraction gratings in accordance with the type of disk. Therefore, as described below, the same diffraction grating is used, but the equation used to calculate signals using the output signals from light detectors of respective light receiving regions is different for a narrow guiding groove in which the ±1st order components of the diffracted light do not overlap, and for a wide guiding groove in which the ±1st components of the diffracted light overlap. Specifically, in order to calculate the signals detected by the light detectors, different equations are used for the DVD-R/RW disk and the DVD-RAM disk.

A specific example of such a calculation is described below using Equation (7) for calculating TES, and with reference to FIGS. 14(a) and 14(b), and FIG. 15.

Figure 14:
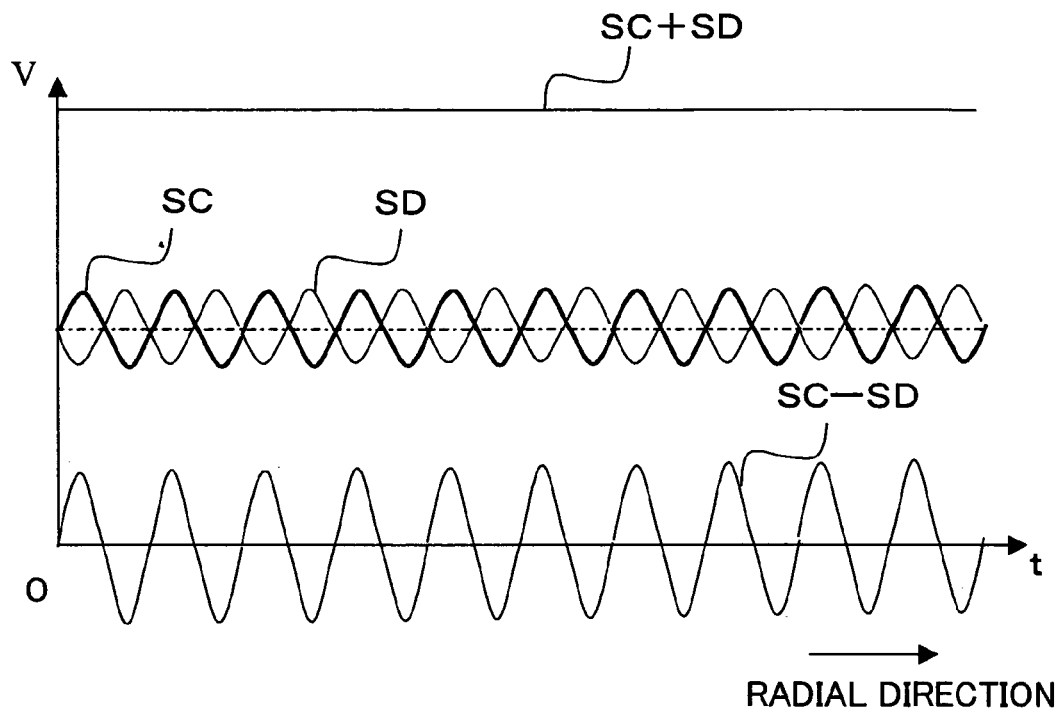
FIG. 14(a) is a graph illustrating components of a track cross signal when a spot on the disk is displaced in a disk radial direction.
FIG. 14(b) is a graph illustrating other components of the track cross signal when a spot on the disk is displaced in the disk radial direction.
Figure 14:
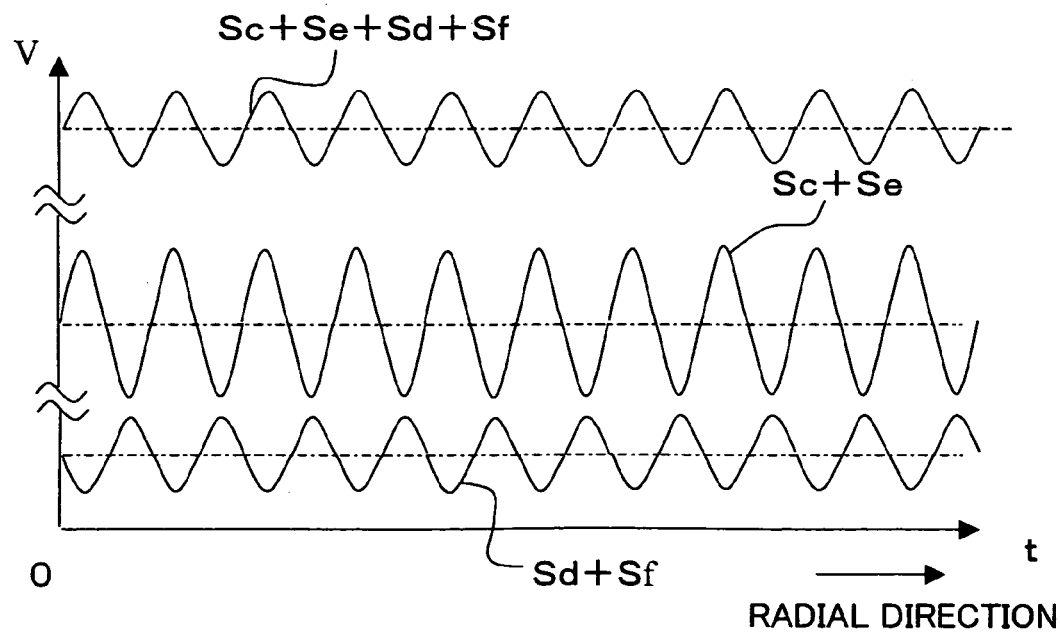

FIGS. 14(a) and 14(b) illustrate output signals when a spot on the disk is displaced in a disk radial direction. Specifically, FIG. 14(a) illustrates output signals SC and SD, an addition signal SC+SD, and a difference signal SC–SD, similar to those used in conjunction only with the hologram 7 of the conventional example.

According to this configuration, as shown in the Figure, the output signals SC and SD have substantially the same value but are out of phase by π. Therefore, while the difference signal SC–SD is a PP signal, the addition signal SC+SD has no PP signal but contains only a DC component.

This is also true for the term Sc+Sd+Se+Sf of Equation (7). For example, in the conventional configuration, the term Sc+Sd+Se+Sf has no PP signal but contains only a DC component, even if the light receiving section 4 is used. Evidently, the conventional configuration, including no diffraction grating 8, does not contain a lens shift component.

FIG. 14(b) illustrates a case where a diffraction grating is provided for one of the ±1st order components of the diffracted light as in the present invention. As in the conventional configuration, SC+SD has no PP component but contains only a DC component. However, the signal output Sc+Sd and the signal output Se+Sf have different amplitudes, because the diffraction efficiency of the diffraction grating is varied in accordance with an incident position of the beam to detect a lens shift component. As a result, the PP signal remains in the addition signal Sc+Sd+Se+Sf.

In Equation (7), (SC+SD)−β×(Sc+Sd+Se+Sf) is for calculating a track offset caused when the object lens shifts. Therefore, if the PP signal remains in (SC+SD)−β×(Sc+Sd+Se+Sf) more than necessary, the track error signal TES cannot have a value that is obtained by subtracting a residual PP component from SD−SC, which is the main PP signal. As a result, the amplitude of the PP signal in the track error signal TES becomes smaller, with the result that the signal-to-noise ratio is decreased.

Therefore, in (SC+SD)−β×(Sc+Sd+Se+Sf), it is preferable that the PP signal remaining in Sc+Sd+Se+Sf is small. The amplitude difference, which is the cause of the residual PP component, varies greatly in accordance with the states of the ±1st order components of the diffracted light.

Therefore, when accommodating to a specific type of disk, the diffraction grating can be optimally designed in conformity with the specification of the disk, so as to reduce the amplitude difference as small as possible, and thereby to suppress the residual PP signal. However, sufficient measures cannot be taken if disks of different specifications are used.

In this regard, described below is how the AC component of the TES signal is removed even when disks of different specifications are used for recording and reproduction. Here, the AC component is the unnecessary component caused when the diffraction efficiency of the diffraction grating differs from position to position.

Figure 15:
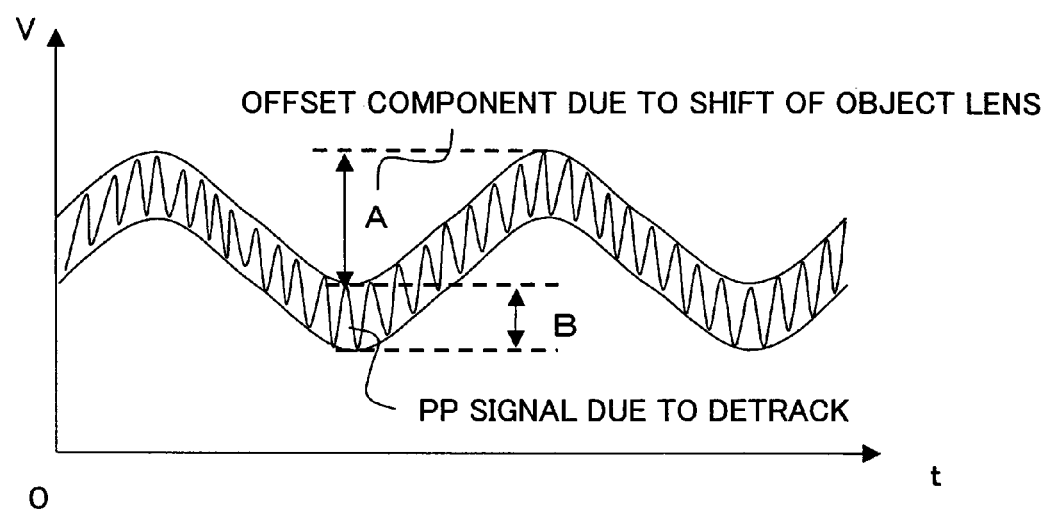
FIG. 15 is a schematic graph illustrating a relationship between PP signal and offset when an object lens is shifted.

FIG. 15 schematically illustrates the main PP signal. Assuming that a signal component of a track displacement of the main PP signal is B (short period), and that an offset signal component is A (long period), the AC component can be removed by reducing A/B.

Therefore, the polarity and the absolute value of the constant a in Equation (7) for calculating TES are set in accordance with a degree of overlap of the first order components of the diffracted light, so that the offset signal component A caused by a shift of the object lens becomes small, and that the PP signal component B caused by a track shift becomes large. In this way, it is possible to suppress an apparent AC component, as described below.

Figure 16:
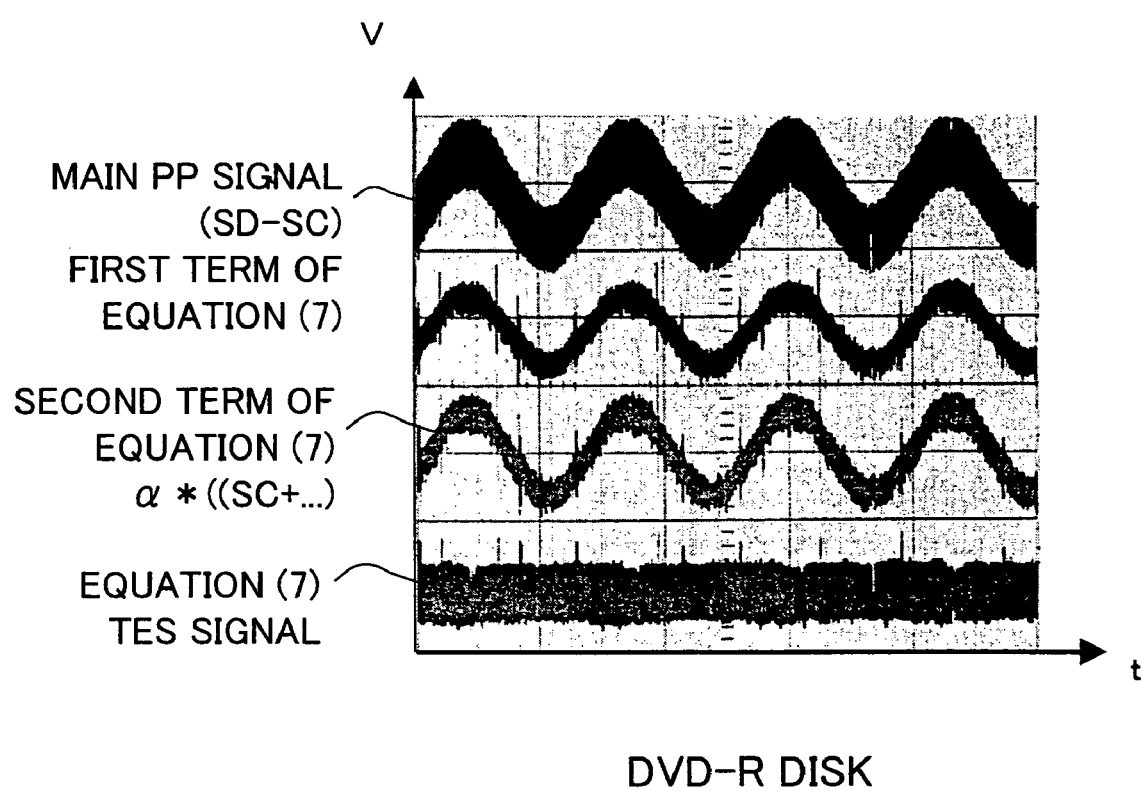
FIG. 16 is a graph measuring a relationship between PP signal and offset when the object lens is shifted, when the DVD-R disk is used.

FIG. 16 illustrates a result of measurement of TES when a diffraction grating that is optimally designed for the DVD-R/RW disk is used. Here, the TES signal is almost entirely of a DC component, thus obtaining a suitable signal.

Figure 17:
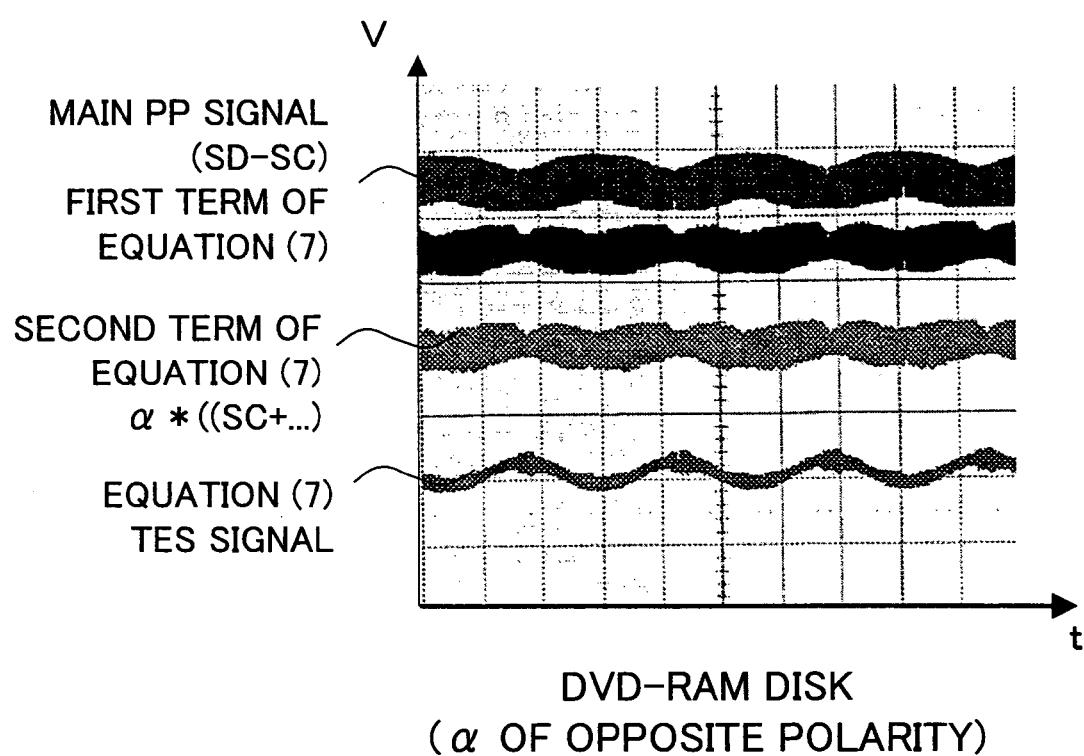
FIG. 17 is a graph measuring a relationship between PP signal and offset when the object lens is shifted, when the DVD-RAM disk is used.

Similarly, FIG. 17 illustrates a result of measurement for the DVD-RAM disk, when only the absolute value of the constant a in Equation (7) for calculating TES is changed without changing the polarity. Here, the TES signal includes the AC component. As a result, the offset caused by a shift of the lens cannot be removed.

Figure 18:
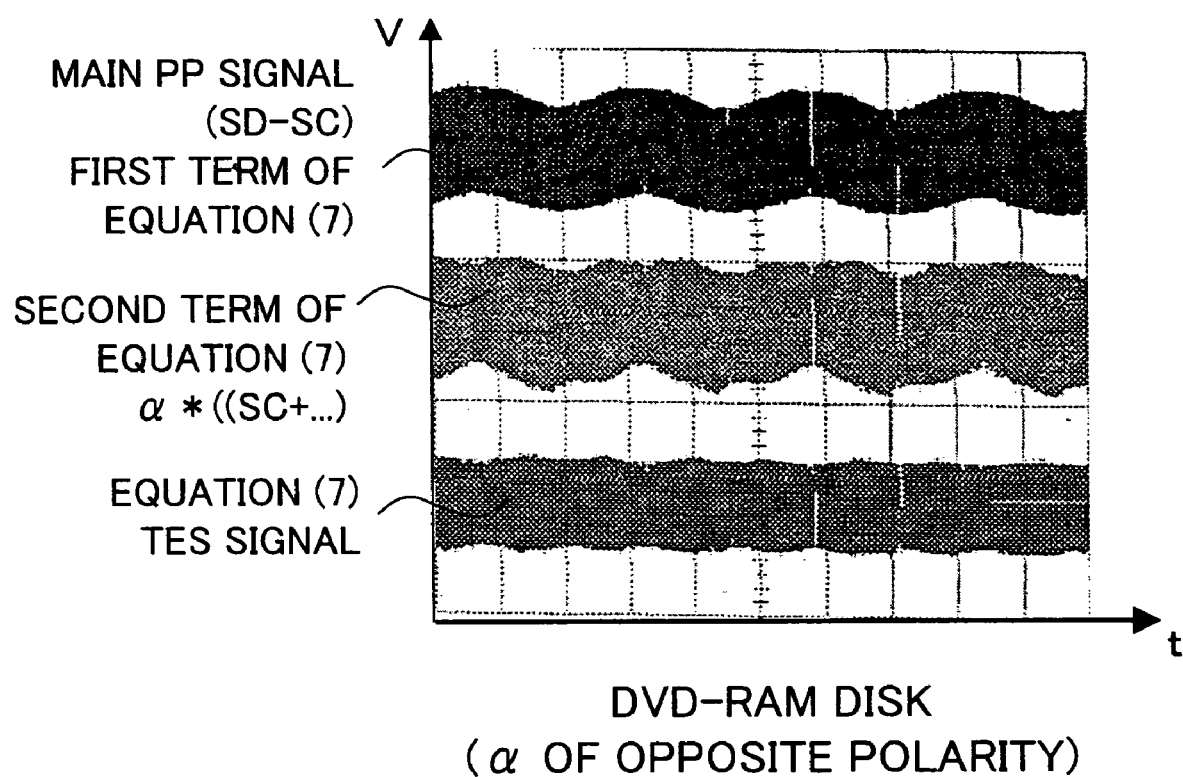
FIG. 18 is a graph measuring a relationship between PP signal and offset when the object lens is shifted, when the DVD-RAM disk is used and the polarity of α in Equation (7) is reversed.

Therefore, in order to minimize the A/B described above, the polarity of the constant a is reversed, or the absolute value of the constant a is changed. The result is shown in FIG. 18. As a result, A/B is minimized, and the offset of the TES signal caused by a shift of the lens can be removed.

From this, it is found that the A/B of the TES calculated in Equation (7) can be suppressed when carrying out recording and reproduction for the DVD-RAM disk, using the diffraction grating that is optimally designed for the DVD-R/RW disk.

It was also confirmed that the A/B of TES calculated in Equation (7) can be suppressed when carrying out recording and reproduction for the DVD-R/RW disk, using the diffraction grating that is optimally designed for the DVD-RAM disk.

It can be seen from these results that the offset of the TES signal caused by a lens shift can be removed and compatibility between DVD-R/RW disk and DVD-RAM disk can be ensured by optimally designing the diffraction grating for either one of the DVD-R/RW disk and the DVD-RAM disk, and by reversing the polarity of the constant and changing its absolute value.

Therefore, the optical disk device can accommodate disks of different specifications by reversing the polarity of the constant used for calculating the tracking error signal.

Although the foregoing embodiments described DVD disks as an example of the information recording medium, the information recording medium is not limited to DVD disks. The information recording medium may be optical disks such as CD (Compact Disk), or magneto-optical disks such as MO (Magneto Optical).

The specific embodiments and examples described in the BEST MODE FOR CARRYING OUT THE INVENTION section are only for clarifying technical contents of the present invention. The present invention should not be interpreted as being limited to these specific examples, but may be varied in many ways within the spirit of the invention and the scope of the claims.

The matter recited in claims and the technical means described in the best mode for carrying out the invention section may be suitably combined in any ways, and such combinations are intended to be included within the scope of the present invention.

INDUSTRIAL APPLICABILITY

According to a light integration unit of the present invention, by using a one-beam method which does not decrease a light quantity of a main beam, stable tracking servo performance can be obtained by suppressing shift of an object lens and tilt of the disk. An optical pickup device and an optical disk device that use the light integration unit require no adjustment of a signal detection system, thereby providing an optical pickup device and an optical disk device that are small, thin, easy to assemble, and reliable.

The invention claimed is:

1. A light integration unit, including a light emitting section for emitting a laser beam onto an information recording medium having a disk shape, a light splitting element for reflecting a reflected light beam from the information recording medium onto a hologram, a hologram for diffracting a light beam from the light splitting element to a light receiving section, and a light receiving section for receiving the light beam diffracted by the hologram, the light integration unit comprising:

an optical element provided between the hologram and the light receiving section, a transmittance and/or diffraction efficiency of the optical element varying in a disk radial direction.

2. The light integration unit as set forth in claim 1, wherein:

the light splitting element is a polarizing beam splitter.

3. The light integration unit as set forth in claim 1, wherein:

in the hologram, a groove depth d of a diffraction grating satisfies:

$d \times (n-1) = (k+1/2)\lambda$ where n is a refraction index of a grating substrate, $\lambda$ is a wavelength of the light beam, and k is an integer.

4. The light integration unit as set forth in claim 1, wherein:

the light receiving section has light receiving regions respectively for a +1st order component and a −1st order component of the diffracted light beam from the hologram.

5. The light integration unit as set forth in claim 4, wherein:

the optical element is so disposed that only one of the +1st order component and the −1st order component of the diffracted light beam from the hologram is transmitted through the optical element.

6. A light integration unit in which a laser beam is emitted from a light emitting section onto an information recording medium having a disk shape, and servo control of emitting a laser beam is performed in accordance with a reflected light beam from the information recording medium, the light integration unit comprising an optical element, provided in a path of the reflected light beam, whose transmittance and/or diffraction efficiency varies in a disk radial direction, the optical element being a diffraction grating that is so disposed that a grating longitudinal direction is the disk radial direction and the transmittance and/or diffraction efficiency varying in the grating longitudinal direction, and the diffraction efficiency of the diffraction grating varying; and a width ratio between a land and a groove of the diffraction grating continuously varying in the grating longitudinal direction.

7. The light integration unit as set forth in claim 6, wherein:

the width ratio between the land and the groove of the diffraction grating non-linearly and continuously varies in the grating longitudinal direction, so as to expand a region where a rate of change of diffraction efficiency is constant.

8. A light integration unit in which a laser beam is emitted from a light emitting section onto an information recording medium having a disk shape, and servo control of emitting a laser beam is performed in accordance with a reflected light beam from the information recording medium, the light integration unit comprising an optical element, provided in a path of the reflected light beam, whose transmittance and/or diffraction efficiency varies in a disk radial direction, the optical element being a diffraction grating that is so disposed that a grating longitudinal direction is the disk radial direction and the transmittance and/or diffraction efficiency varying in the grating longitudinal direction, and the diffraction efficiency of the diffraction grating varying;

the diffraction grating being orthogonally divided into a plurality of regions with respect to a direction perpendicular to the grating longitudinal direction; and each region of the diffraction grating having a different rate of change of diffraction efficiency in the grating longitudinal direction.

9. The light integration unit as set forth in claim 8, wherein:

the diffraction grating is orthogonally divided into a plurality of regions with respect to a direction perpendicular to the grating longitudinal direction;

the plurality of regions of the diffraction grating include a region in which a width ratio of land and groove of the diffraction grating continuously varies in the grating longitudinal direction to continuously vary diffraction efficiency; and the plurality of regions of the diffraction grating include a region in which a width ratio of land and groove of the diffraction grating is constant to attain constant diffraction efficiency.

10. The light integration unit as set forth in claim 8, wherein:

the diffraction grating is orthogonally divided into two regions with respect to a direction perpendicular to the grating longitudinal direction by such a divisional line that one of the diffraction gratings includes a region which transmits a portion of overlap of a zeroth order component and ±1st order components of light reflected and diffracted on the information recording medium having a grooved shape, and that the other of the diffraction gratings include a region which transmits a portion of non-overlap of the zeroth order diffraction component and the ±1st order components.

11. The light integration unit as set forth in claim 8, wherein:
- the diffraction grating is orthogonally divided into a plurality of regions with respect to a direction perpendicular to the grating longitudinal direction; and
- a rate of change of diffraction efficiency of the diffraction grating divided into a plurality of regions is varied in such a manner that an overall diffraction efficiency of a portion of the diffraction grating transmitting a portion of overlap of a zeroth order component and +1st order components of light reflected and diffracted on the information recording medium having a grooved shape is substantially equal to an overall diffraction efficiency of a portion of the diffraction grating transmitting a portion of overlap of the zeroth order component and the −1st order components.

12. An optical pickup device, comprising:
the light integration unit of any one of claims 1,-5, 6, 7, and 8-11 and
object lens means for focusing, onto a disk, a laser beam emitted from the light integration unit.

13. An optical disk device, comprising:
the optical pickup device of claim 12.

14. An optical disk device including an optical pickup device that includes: a light emitting section for emitting a laser beam onto an information recording medium having a disk shape; an object lens for focusing the laser beam onto the information recording medium; a light splitting element for reflecting a reflected light beam from the information recording medium onto a hologram; a hologram for diffracting a light beam from the light splitting element onto a light receiving section; a light receiving section for receiving the light beam diffracted by the hologram; and an optical element, provided between the hologram and the light receiving section, whose transmittance and/or diffraction efficiency varies in a disk radial direction, the optical disk device carrying out recording and reproduction by tracking based on a calculation of a signal supplied from the optical pickup device,
- the optical disk device being compatible with disks of different specifications by reversing a polarity of a coefficient used in the calculation of a tracking error signal.

* * * * *